US011814593B1

United States Patent
Al Herz et al.

(10) Patent No.: US 11,814,593 B1
(45) Date of Patent: Nov. 14, 2023

(54) PROCESSES FOR HYDROPROCESSING AND CRACKING CRUDE OIL

(71) Applicant: Saudi Arabian Oil Company, Dhahran (SA)

(72) Inventors: Mansour Ali Al Herz, Dhahran (SA); Aaron Akah, Dhahran (SA); Qi Xu, Dhahran (SA); Lianhui Ding, Dhahran (SA); Bander Al Ghamdi, West Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/064,488

(22) Filed: Dec. 12, 2022

(51) Int. Cl.
  *C10G 69/04* (2006.01)
  *B01J 29/40* (2006.01)
  (Continued)

(52) U.S. Cl.
  CPC .............. *C10G 69/04* (2013.01); *B01J 21/04* (2013.01); *B01J 21/08* (2013.01); *B01J 21/16* (2013.01);
  (Continued)

(58) Field of Classification Search
  CPC ............ C10G 11/18; C10G 2300/1033; C10G 2300/301; C10G 2300/308;
  (Continued)

(56) References Cited

U.S. PATENT DOCUMENTS

| 5,318,695 A | 6/1994 | Eberly |
| 7,019,187 B2 | 3/2006 | Powers |

(Continued)

FOREIGN PATENT DOCUMENTS

| WO | 2009073436 A2 | 6/2009 |
| WO | 2010009077 A2 | 1/2010 |

(Continued)

OTHER PUBLICATIONS

Al-Absi et al., "Thermal and catalytic cracking of whole crude oils at high severity", Journal Pyrolysis, vol. 145, 104705, 11 pages, 2020.

(Continued)

*Primary Examiner* — Randy Boyer
*Assistant Examiner* — Juan C Valencia
(74) *Attorney, Agent, or Firm* — DINSMORE & SHOHL LLP

(57) ABSTRACT

According to at least one aspect of the present disclosure, a process for processing a crude oil with an API between 30 and 35 degrees includes contacting the crude oil with one or more hydroprocessing catalysts to produce a hydroprocessed effluent. The hydroprocessed effluent is passed to an HS-FCC unit, where the hydroprocessed effluent is contacted with a cracking catalyst composition comprising nano-ZSM-5 zeolite and an ultrastable Y-type zeolite (USY zeolite) to form a cracked effluent comprising at least one product. The HS-FCC catalyst composition further comprises nano-ZSM-5 zeolite that has an average particle size (Continued)

of from 0.01 micrometers (μm) to 0.2 μm, USY zeolite impregnated with lanthanum, an alumina binder, colloidal silica, and a matrix material comprising Kaolin clay. The cracked effluent comprises at least olefins, aromatic compounds, or both.

19 Claims, 5 Drawing Sheets

(51) Int. Cl.
*B01J 35/02* (2006.01)
*B01J 21/04* (2006.01)
*B01J 21/08* (2006.01)
*B01J 21/16* (2006.01)

(52) U.S. Cl.
CPC .............. *B01J 29/40* (2013.01); *B01J 29/405* (2013.01); *B01J 35/023* (2013.01); *C10G 2300/1048* (2013.01); *C10G 2300/202* (2013.01); *C10G 2300/205* (2013.01); *C10G 2300/301* (2013.01); *C10G 2300/308* (2013.01); *C10G 2300/4006* (2013.01); *C10G 2300/4012* (2013.01); *C10G 2400/20* (2013.01)

(58) Field of Classification Search
CPC ........ C10G 2300/4006; C10G 2300/70; C10G 2400/20; B01J 29/088; B01J 29/40; B01J 35/0006; B01J 35/0013; B01J 35/006; B01J 37/0009; B01J 37/0201
See application file for complete search history.

(56) References Cited

U.S. PATENT DOCUMENTS

| | | |
|---|---|---|
| 7,459,596 B1 | 12/2008 | Abrevaya |
| 8,137,533 B2 | 3/2012 | Towler |
| 10,059,642 B1 * | 8/2018 | Al-Herz ................. B01J 29/088 |
| 10,954,457 B2 | 3/2021 | Al-Herz |
| 2005/0211603 A1 | 9/2005 | Guillaume |
| 2011/0083996 A1 | 4/2011 | Shafi |
| 2014/0275673 A1 | 9/2014 | Long |
| 2020/0255753 A1 * | 8/2020 | Al-Ghrami .......... C10G 11/182 |
| 2020/0291306 A1 * | 9/2020 | Aitani ................. C10G 51/026 |

FOREIGN PATENT DOCUMENTS

| | | |
|---|---|---|
| WO | 2010009082 A1 | 1/2010 |
| WO | 2010009089 A2 | 1/2010 |
| WO | 2013142563 A2 | 9/2013 |

OTHER PUBLICATIONS

Chen et al., "Novel Propylene Production Route: Utilizing Hydrotreated Shale Oil as Feedstock via Two-Stage Riser Catalytic Cracking", Energy & Fuels, vol. 29, pp. 7190-7195, 2015.
Corma et al., "Crude oil to chemicals: light olefins from crude oil", Catalysis Science & Technology, vol. 7, No. 12, 35 pages, 2017.
Usman et al., "Catalytic cracking of crude oil to light olefins and naphtha: Experimental and kinetic modeling", Chemical Engineering Research and Design, vol. 120, pp. 121-137, 2017.

* cited by examiner

PROCESSES FOR HYDROPROCESSING AND CRACKING CRUDE OIL

BACKGROUND

Field

The present disclosure relates to processes for the processing of petroleum-based materials, in particular, systems and methods for processing petroleum-based materials, such as crude oil, through hydroprocessing and high-severity fluidized catalytic cracking to form chemical products and intermediates such as olefins and aromatics.

Technical Background

The worldwide increasing demand for chemical intermediates such as light olefins remains a major challenge for many integrated refineries. In particular, the production of some valuable light olefins, such as ethylene and propylene, has attracted increased attention as pure olefin streams are considered the building blocks for polymer synthesis. The production of light olefins depends on several process variables, such as the feed type, operating conditions, and the type of catalyst. These compounds can be produced through high-severity fluidized catalytic cracking (HS-FCC) of petroleum gases and distillates such as naphtha, kerosene, or even gas oil in the presence of an HS-FCC catalyst. FCC performed under high-severity conditions has shown the potential for converting low-value refinery streams into high value chemical intermediates. However, the feedstocks available for high-severity fluidized catalytic cracking (HS-FCC) processes are limited and must be obtained through costly and energy intensive refining steps. For example, processes which fractionate the feedstock prior to HS-FCC rely on energy intensive steam cracking to process the lighter fractions, a costly process with little control in the production of desirable products. While crude oil may be a potential feedstock, the concentrations of metal, nitrogen, and sulfur in crude oil contributes to deactivation of the HS-FCC catalysts. Further, it is extremely difficult to efficiently crack a feedstock with a wide boiling point range, such as crude oil, over a single HS-FCC catalyst.

SUMMARY

Accordingly, there is an ongoing need for processes for upgrading crude oil feeds, such as Arab Medium crude oil, to produce olefins with a greater selectivity and yield of light olefins from hydrocarbon feeds compared to conventional methods for cracking hydrocarbon feeds.

Embodiments of the present disclosure meet this need of improved crude oil upgrading by utilizing a hydroprocessing unit and a high-severity fluidized catalytic cracking (HS-FCC) unit downstream of the hydroprocessing unit. The hydroprocessing unit may be operable to hydroprocess the crude oil feed to form a hydroprocessed effluent by contacting the crude oil feed with a hydrodemetalization (HDM) catalyst, a hydrodesulfurization (HDS) catalyst, and a hydrodearomatization (HDA) catalyst. The hydroprocessed effluent is passed from the hydroprocessing unit to the HS-FCC unit to form a cracked effluent, where the hydroprocessed effluent is contacted with an HS-FCC catalyst comprising a nano-ZSM-5 zeolite and an ultrastable Y-type zeolite, where the nano-ZSM-5 zeolite has an average particle size of from 0.01 micrometers (μm) to 0.2 μm. The inclusion of these different zeolitic components may increase the selectivity and yield of light olefins when fluid catalytic cracking a hydoprocessed crude oil, for example, hydroprocessed Arab Medium oil. Further, the reduced size of the nano-ZSM-5 zeolite can reduce coke formation and pore diffusion on the HS-FCC catalyst composition. The HS-FCC catalyst composition may also demonstrate a reduced deactivation rate, which may improve the economics of light olefin production, among other features.

According to at least one aspect of the present disclosure, a process for upgrading a crude oil includes contacting the crude oil with an HDM catalyst, an HDS catalyst, and an HDA catalyst at conditions operable to hydroprocess the crude oil to form a hydroprocessed effluent. The crude oil has an American Petroleum Institute (API) gravity of from 30 degrees to 35 degrees. The hydroprocessed effluent may be contacted with an HS-FCC catalyst composition in a high-severity fluidized catalytic cracking (HS-FCC) unit at a temperature of greater than or equal to 580° C., a weight ratio of the HS-FCC catalyst to the crude oil of from 2:1 to 10:1, and a residence time of from 0.1 seconds to 60 seconds, where the HS-FCC catalyst can comprise ultrastable Y-type zeolite (USY zeolite) impregnated with lanthanum, nano-ZSM-5 zeolite impregnated with phosphorous, where the nano-ZSM-5 zeolite can have an average particle size of from 0.01 μm to 0.2 μm, an alumina binder, colloidal silica, and a matrix material comprising Kaolin clay and contacting can cause at least a portion of hydrocarbons in the crude oil to undergo cracking reactions to produce a cracked effluent.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
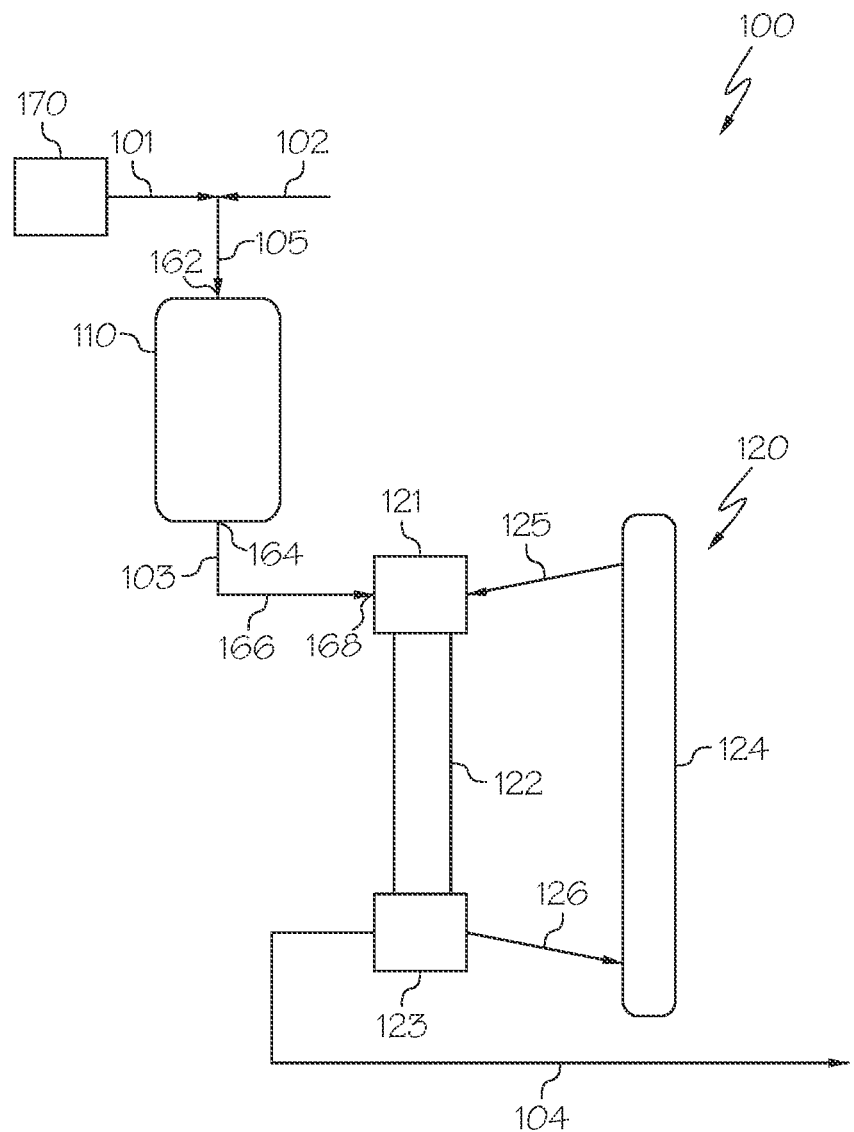
FIG. 1 depicts a generalized schematic diagram of an embodiment of a crude oil upgrading system that includes a hydroprocessing unit and a high-severity fluidized catalytic cracking (HS-FCC) unit, according to one or more embodiments described in this disclosure.

For the purpose of describing the simplified schematic illustrations and descriptions of FIGS. 1-5, the numerous valves, temperature sensors, electronic controllers and the like that may be employed and well known to those of ordinary skill in the art of certain chemical processing operations are not included. Further, accompanying components that are often included in chemical processing operations, such as refineries, such as, for example, air supplies, catalyst hoppers, flue gas handling, or other related systems are not depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more process components signify a product stream which exits the depicted process or a process inlet stream which enters the depicted process. Product streams may be further processed in accompanying chemical processing systems or may be commercialized as end products. Process inlet streams may be streams transferred from accompanying chemical processes or may be non-processed feedstock streams. Some arrows may represent recycle streams, which are effluent streams of system components that are recycled back into the system. However, it should be understood that any represented recycle stream, in some embodiments, may be replaced by a process inlet stream of the same material, and that a portion of a recycle stream may exit the process as a product.

Additionally, arrows in the drawings may schematically depict process steps of transporting a stream from one process component to another process component. For example, an arrow from one process component pointing to another process component may represent "passing" a system component effluent to another system component, which may include the contents of a process stream "exiting" or being "removed" from one process component and "introducing" the contents of that product stream to another process component.

It should be understood that two or more process streams are "mixed" or "combined" when two or more lines intersect in the schematic flow diagrams of FIGS. 1-5. Mixing or combining may also include mixing by directly introducing both streams into a like reactor, separation device, or other process component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

The present disclosure is directed to processes for upgrading crude oil, such as Arab Medium crude oil. According to at least one aspect of the present disclosure, a process for upgrading a crude oil includes contacting the crude oil with an HDM catalyst, an HDS catalyst, and an HDA catalyst at conditions operable to hydroprocess the crude oil to form a hydroprocessed effluent. The crude oil has an American Petroleum Institute (API) gravity of from 30 degrees to 35 degrees. The hydroprocessed effluent may be contacted with an HS-FCC catalyst composition in a high-severity fluidized catalytic cracking (HS-FCC) unit at a temperature of greater than or equal to 580° C., a weight ratio of the HS-FCC catalyst to the crude oil of from 2:1 to 10:1, and a residence time of from 0.1 seconds to 60 seconds, where the HS-FCC catalyst can comprise ultrastable Y-type zeolite (USY zeolite) impregnated with lanthanum, nano-ZSM-5 zeolite impregnated with phosphorous, where the nano-ZSM-5 zeolite can have an average particle size of from 0.01 μm to 0.2 μm, an alumina binder, colloidal silica, and a matrix material comprising Kaolin clay and contacting can cause at least a portion of hydrocarbons in the crude oil to undergo cracking reactions to produce a cracked effluent.

The processes of the present disclosure may enable crude oils to be used as a feedstock for production of light olefins and other chemical products through high-severity fluidized catalytic cracking. The hydroprocessing of the crude oil may remove metals, sulfur, nitrogen, and aromatic compounds that may cause deactivation of cracking catalysts under high-severity conditions. Thus, the processes of the present disclosure may increase the efficiency of the HS-FCC-based process by reducing catalyst deactivation and reducing the need for adding make-up catalysts. The processes of the present disclosure may also enable crude oil and other heavy oils to be introduced directly to the process without upstream separation processes, such as fractionation columns, that can be costly to construct and operate. Additionally, the processes of the present disclosure may convert crude oil directly to light olefins without the use of steam cracking, which is energy intensive and offers very little control over the ratio of ethylene to propene in the steam cracking effluent.

As used in this disclosure, a "catalyst" refers to any substance which increases the rate of a specific chemical reaction. Catalysts described in this disclosure may be utilized to promote various reactions, such as, but not limited to, hydrodemetalization, hydrodesulfurization, hydrodenitrogenation, hydrodearomatization, cracking, fluidized catalytic cracking, aromatic cracking, or combinations thereof.

As used in the present disclosure, the term "used catalyst" refers to catalyst that has been contacted with reactants at reaction conditions, but has not been regenerated in a regenerator. The "used catalyst" may have coke deposited on the catalyst and may include partially coked catalyst as well as fully coked catalysts. The amount of coke deposited on the "used catalyst" may be greater than the amount of coke remaining on the regenerated catalyst following regeneration. The "used catalyst" may also include catalyst that has a reduced temperature due to contact with the reactants compared to the catalyst prior to contact with the reactants.

As used in the present disclosure, the term "regenerated catalyst" refers to catalyst that has been contacted with reactants at reaction conditions and then regenerated in a regenerator to heat the catalyst to a greater temperature, oxidize and remove at least a portion of the coke from the catalyst to restore at least a portion of the catalytic activity of the catalyst, or both. The "regenerated catalyst" may have less coke, a greater temperature, or both, compared to used catalyst and may have greater catalytic activity compared to used catalyst. The "regenerated catalyst" may have more coke and lesser catalytic activity compared to fresh catalyst that has not passed through a cracking reaction zone and regenerator.

As used in the present disclosure, the term "deactivated catalyst" refers to a catalyst that has lost function and differs from used catalyst, in that the deactivated catalyst is generally not capable of being regenerated in the regenerator during steady state operation of the regeneration system. The deactivated catalyst can be deactivated by contaminants and/or metals in the hydrocarbon feed or a steam feed depositing on the surfaces of the catalyst.

As used in the present disclosure, the term "crude oil" refers to a mixture of petroleum liquids and gases, including impurities, such as sulfur-containing compounds, nitrogen-containing compounds, and metal compounds, extracted directly from a subterranean formation or received from a desalting unit without having any fractions, such as naphtha, separated by distillation.

As used in the present disclosure, the term "directly" refers to the passing of materials, such as an effluent, from a first component of the crude oil upgrading system 100 to a second component of the crude oil upgrading system 100 without passing the materials through any intervening components or processes operable to change the composition of the materials. Similarly, the term "directly" also refers to the introducing of materials, such as a feed, to a component of the crude oil upgrading system 100 without passing the materials through any preliminary components operable to change the composition of the materials. Intervening or preliminary components or systems operable to change the composition of the materials can include reactors and separators, but are not generally intended to include heat exchangers, valves, pumps, sensors, or other ancillary components required for operation of a chemical process. Further, combining two streams together upstream of the second component instead of passing each stream to the second component separately is also not considered to be an intervening or preliminary component operable to change the composition of the materials.

As used in this disclosure, a "reactor" refers to any vessel, container, or the like, in which one or more chemical reactions may occur between one or more reactants optionally in the presence of one or more catalysts. For example, a reactor may include a tank or tubular reactor configured to operate as a batch reactor, a continuous stirred-tank reactor (CSTR), or a plug flow reactor. Example reactors include packed bed reactors such as fixed bed reactors, and fluidized bed reactors. One or more "reaction zones" may be disposed within a reactor. As used in this disclosure, a "reaction zone" refers to an area where a particular reaction takes place in a reactor. For example, a packed bed reactor with multiple catalyst beds may have multiple reaction zones, where each reaction zone is defined by the area of each catalyst bed.

As used in this disclosure, a "separation unit" refers to any separation device that at least partially separates one or more chemicals in a mixture from one another. For example, a separation unit may selectively separate differing chemical species from one another, forming one or more chemical fractions. Examples of separation units include, without limitation, distillation columns, flash drums, knock-out drums, knock-out pots, centrifuges, filtration devices, traps, scrubbers, expansion devices, membranes, solvent extraction devices, and the like. It should be understood that separation processes described in this disclosure may not completely separate all of one chemical consistent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided or separated into two or more process streams of desired composition. Further, in some separation processes, a "light fraction" and a "heavy fraction" may separately exit the separation unit. In general, the light fraction stream has a lesser boiling point than the heavy fraction stream. It should be additionally understood that where only one separation unit is depicted in a figure or described, two or more separation units may be employed to carry out the identical or substantially identical separation. For example, where a distillation column with multiple outlets is described, it is contemplated that several separators arranged in series may equally separate the feed stream and such embodiments are within the scope of the presently described embodiments.

As used in this disclosure, the term "effluent" may refer to a stream that is passed out of a reactor, a reaction zone, or a separation unit following a particular reaction or separation. Generally, an effluent has a different composition than the stream that entered the separation unit, reactor, or reaction zone. It should be understood that when an effluent is passed to another system unit, only a portion of that process stream may be passed. For example, a slip stream may carry some of the effluent away, meaning that only a portion of the effluent may enter the downstream process unit. The term "reaction effluent" may more particularly used to refer to a stream that is passed out of a reactor or reaction zone.

As used in the present disclosure, the term "high-severity conditions" refers to operating conditions of a fluid catalytic cracking system, such as the crude oil upgrading system 100, that include temperatures greater than or equal to 580° C., or from 580° C. to 750° C., a catalyst to oil ratio greater than or equal to 1:1, or from 1:1 to 60:1, and a residence time of less than or equal to 60 seconds, or from 0.1 seconds to 60 seconds, each of which conditions may be more severe than typical operating conditions of fluid catalytic cracking systems.

As used in the present disclosure, the term "catalyst to oil ratio" or "CTO" refers to the weight ratio of a catalyst, such as the HS-FCC catalyst composition 125 of the HS-FCC unit 120, to a process stream comprising hydrocarbons, such as the hydroprocessed effluent 103 passing to the HS-FCC unit 120.

The term "residence time" refers to the amount of time that reactants, such as the hydrocarbons in the hydroprocessed effluent 103 passing to the HS-FCC unit 120, are in contact with a catalyst, at reaction conditions, such as at the reaction temperature.

As used in the present disclosure, the term "particle size" refers to the maximum length of a particle from one side to another, measured along the longest distance of the particle. The "average particle size" is an average of the particle size taken over a sample of the particles. For spherical particles, the average particle size is equal to the average particle diameter of the spherical particles as determined by electron microscopy.

As used in this disclosure, "cracking" generally refers to a chemical reaction where a molecule having carbon-carbon bonds is broken into more than one molecule by the breaking of one or more of the carbon-carbon bonds; where a compound including a cyclic moiety, such as an aromatic, is converted to a compound that does not include a cyclic moiety; or where a molecule having carbon-carbon double bonds are reduced to carbon-carbon single bonds. Some catalysts may have multiple forms of catalytic activity, and calling a catalyst by one particular function does not render that catalyst incapable of being catalytically active for other functionality.

It should be understood that the reactions promoted by catalysts as described in this disclosure may remove a chemical constituent, such as only a portion of a chemical constituent, from a process stream. For example, an HDM catalyst may be present in an amount sufficient to promote a reaction that removes a portion of one or more metals from a process stream. A hydrodenitrogenation (HDN) catalyst may be present in an amount sufficient to promote a reaction that removes a portion of the nitrogen present in a process stream. An HDS catalyst may be present in an amount sufficient to promote a reaction that removes a portion of the sulfur present in a process stream. Additionally, an HDA catalyst, such as a hydrocracking catalyst, may be present in an amount sufficient to promote a reaction that converts aromatics, which are hard to crack in the HS-FCC unit, to naphthalenes, paraffinic compounds, or both, which are easier to crack in the HS-FCC unit. It should be understood that, throughout this disclosure, a particular catalyst may not be limited in functionality to the removal, conversion, or cracking of a particular chemical constituent or moiety when it is referred to as having a particular functionality. For example, a catalyst identified in this disclosure as an HDN catalyst may additionally provide hydrodearomatization functionality, hydrodesulfurization functionality, or both.

It should further be understood that streams may be named for the components of the stream, and the component for which the stream is named may be the major component of the stream (such as comprising from 50 wt. %, from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one process component to another when a stream comprising that component is disclosed as passing from that process component to another. For example, a disclosed "hydrogen stream" passing to a first process component or from a first process component to a second process component should be understood to equivalently disclose "hydrogen" passing to the first process component or passing from a first process component to a second process component.

The composition of feed streams and processing variables of FCC processes play a significant role on the reaction yields and heat balance within the systems. Conventional FCC processes can require costly refining to produce suitable feed streams. Such additional costly refining can include separating and processing of one or more fractions of a hydrocarbon feedstock before introducing the refined conventional feed into the FCC process. These additional processing steps are energy intensive and reduce the amount of viable feed from an existing hydrocarbon source. Previous processes have been developed to convert crude oil to greater value chemical products and intermediates directly through catalytic cracking to attempt to overcome these limitations, such as by reducing or eliminating the processing steps needed to produce a suitable hydrocarbon feed before introduction into an FCC process. However, contaminants, metals, or both present in heavy hydrocarbon feeds, such as crude oil, can deactivate the catalyst, resulting in decreased yields and increased production costs.

Accordingly, aspects of the present disclosure are directed to HS-FCC catalyst compositions and processes for converting crude oil directly to greater value chemical products and intermediates, such as but not limited to olefins and aromatic compounds, through FCC processes using the HS-FCC catalyst compositions and reaction conditions that result in efficient cracking of the crude oil, while resisting deactivation of the catalyst. The HS-FCC catalyst composition of the present disclosure includes a nano-ZSM-5 zeolite, an ultrastable Y-type zeolite, an alumina binder, a matrix material comprising Kaolin clay, and colloidal silica. The processes of the present disclosure include contacting a crude oil feed stream with the HS-FCC catalyst composition in a high-severity fluidized catalytic cracking (HS-FCC) system at high severity conditions sufficient to convert at least a portion of the crude oil feed stream to light olefins, aromatic compounds, or both. The HS-FCC catalyst compositions and reaction conditions of the processes of the present disclosure can enable the crude oil to be directly converted to light olefins, aromatic compounds, or both efficiently while resisting deactivation of the catalysts, among other features.

Referring now to FIG. 1, a crude oil upgrading system 100 is schematically depicted that includes a hydroprocessing unit 110 and an HS-FCC unit 120 downstream of the hydroprocessing unit 110. The crude oil upgrading system 100 receives a crude oil 101 and directly processes the crude oil 101 to form one or more petrochemical products. In some embodiments, the crude oil 101 may not undergo any pretreatment, separation, or other operation which may change the composition of the crude oil 101 prior to introducing the crude oil 101 to the hydroprocessing unit 110 or combining the crude oil 101 with hydrogen to form a mixed stream 105 that is introduced to the hydroprocessing unit 110. For example, the crude oil 101 may not be separated (fractionated) into greater and lesser boiling point fractions prior to being introduced to the hydroprocessing unit 110. In some embodiments, the crude oil upgrading system 100 may include a crude oil source 170. The crude oil 101 may be passed directly from the crude oil source 170 to an inlet 162 of the hydroprocessing unit 110.

The crude oil source 170 may be a storage vessel, pipeline, crude oil production facility, petroleum refinery, or other crude oil source 170. The crude oil 101 may include one or more of crude oil, vacuum residue, tar sands, bitumen, atmospheric residue, vacuum gas oils, other heavy oil streams, or combinations of these. In some embodiments, the crude oil 101 may be a crude oil having an American Petroleum Institute (API) gravity of from 30 degrees to 35 degrees. For example, in some embodiments, the crude oil 101 may include an Arab Medium crude oil. Example properties for an exemplary grade of Arab Medium crude oil are listed in Tables 1 and 2, which are provided subsequently in this disclosure. It should be understood that, as used in this disclosure, a "crude oil" may refer to a raw hydrocarbon which has not been previously processed or may refer to a hydrocarbon which has undergone some degree of processing prior to being introduced to the crude oil upgrading system 100 in the crude oil 101.

TABLE 1

Example of Arab Medium Crude Oil Feedstock

| Analysis | Units | Value | Test Method |
|---|---|---|---|
| API | Degrees | 31° | ASTM D287-12b |
| Density | grams per cubic centimeter (g/cm$^3$) | 0.8748 | ASTM D4052 |
| Sulfur Content | weight percent (wt. %) | 2.44 | ASTM D4294 |
| Nitrogen Content | parts per million by weight (ppmw) | 1718 | ASTM D4629 |
| Vanadium (V) Content | ppm | 32 | ASTM D4294 |
| Nickel (Ni) Content | ppm | <1 | ASTM D4294 |
| Iron (Fe) Content | ppm | <1 | ASTM D4294 |
| Sodium (Na) Content | ppm | 32 | ASTM D3230 |

TABLE 2

Example Boiling Point Distribution of Arab Medium Crude Feedstock

| Initial Boiling Point (IBP) | Degrees Celsius (° C.) | Value | Test Method |
|---|---|---|---|
| 5% Boiling Point (BP) | ° C. | 88 | ASTM D7169 |
| 10% BP | ° C. | 131 | ASTM D7169 |
| 20% BP | ° C. | 196 | ASTM D7169 |
| 30% BP | ° C. | 262 | ASTM D7169 |
| 40% BP | ° C. | 326 | ASTM D7169 |
| 50% BP | ° C. | 393 | ASTM D7169 |
| 60% BP | ° C. | 465 | ASTM D7169 |
| 70% BP | ° C. | 552 | ASTM D7169 |
| 80% BP | ° C. | 654 | ASTM D7169 |
| 90% BP | ° C. | 721 | ASTM D7169 |
| 95% BP | ° C. | >720 | ASTM D7169 |
| Final Boiling Point (FBP) | ° C. | >720 | ASTM D7169 |

Referring still to FIG. 1, in some embodiments, the crude oil 101 may be mixed with hydrogen 102 to form a mixed stream 105, which may then be introduced to the hydroprocessing unit 110. In some embodiments, the crude oil 101 and the hydrogen 102 may be introduced to the hydroprocessing unit 110 independently. In such embodiments, a mixed stream 105 may not be formed. The hydrogen 102 may be supplied from a hydrogen source outside of the system, such as a feed hydrogen stream, or may be supplied from a system recycle stream, as described subsequently in this disclosure in reference to FIG. 5. In some embodiments, the hydrogen 102 may include hydrogen from a combination of sources such as partially being supplied from a feed hydrogen stream and partially supplied from a system recycle stream. The volumetric ratio of hydrogen 102 to crude oil 101 introduced to the hydroprocessing unit 110 may be from 400:1 to 1500:1, from 600:1 to 1300:1, from 800:1 to 1100:1, or even from 900:1 to 1000:1. The volume ratio of hydrogen 102 to crude oil 101 may depend on the composition of the crude oil 101. Hydrogen 102 may be mixed with crude oil 101 or introduced directly to the hydroprocessing unit 110 as all reactions which occur within the hydroprocessing unit 110 may consume hydrogen as the crude oil 101 undergoes hydroprocessing. In some embodiments, hydrogen 102 may also be incorporated downstream of the crude oil 101. In some embodiments, hydroprocessing unit 110 includes multiple reactors, in such embodiments each reactor may be supplied with hydrogen 102 independently or hydrogen 102 may be mixed with crude oil 101 prior to the first reactor or hydrogen 102 may be mixed with the reaction effluents between each reactor.

The hydroprocessing unit 110 may be operable to at least partially reduce the content of metals, sulfur, and aromatic moieties in the crude oil 101 to produce a hydroprocessed effluent 103. For example, the hydroprocessed effluent 103 passed out of the hydroprocessing unit 110 may have a content of one or more of metals, sulfur, and aromatic compounds that is less than a content of the one or more of metals, nitrogen, sulfur, or aromatic compounds of the crude oil 101 by at least 2 percent (%), at least 5%, at least 10%, at least 25%, at least 50%, or even at least 75%. For example, an HDM catalyst may remove at least a portion of one or more metals from the crude oil 101 and an HDS catalyst may remove at least a portion of the sulfur present in a process stream. Additionally, an HDA catalyst may reduce the amount of aromatic compounds in the crude oil 101 by saturating and cracking those aromatic portions of those aromatic compounds. The hydroprocessing unit 110 may also optionally be operable to reduce the concentration of nitrogen in the crude oil 101, the nitrogen being reduced by one or more of the HDM, HDS, or HDA catalyst or by an optional HDN catalyst incorporated into the hydroprocessing unit 110.

According to one or more embodiments, the hydroprocessing unit 110 may include multiple catalyst beds arranged in series. For example, the hydroprocessing unit 110 may comprise an HDM catalyst, an HDS catalyst, and an HDA catalyst, arranged in series. The catalysts of the hydroprocessing unit 110 may comprise one or more metal catalysts selected from the metallic elements in Groups 5, 6, 8, 9, or 10 of the International Union of Pure and Applied Chemistry (IUPAC) periodic table, such as, but not limited to, molybdenum, nickel, cobalt, and tungsten. The metals of the catalysts may be supported on a support. Support materials are described subsequently in this disclosure in relation to the hydroprocessing catalysts used in each reaction zone of the hydroprocessing unit 110. In some embodiments, one or more catalysts utilized to reduce the content of sulfur, metals, or both (such as the HDM and HDS catalysts) may be positioned upstream of a catalyst which is utilized to convert aromatics to compounds that are more easily cracked (such as the HDA catalyst). The hydroprocessing unit 110 may be operated at a temperature of from 300° C. to 450° C. and at a pressure of from 30 bars (3,000 kilopascals (kPa)) to 200 bars (20,000 kPa), such as from 30 bars (3,000 kPa) to 180 bars (18,000 kPa). The hydroprocessing unit 110 may operate with a liquid hour space velocity (LHSV) of from 0.1 per hour (hr$^{-1}$) to 10 hr$^{-1}$, such as from 0.2 hr$^{-1}$ to 10 hr$^{-1}$.

The HDM catalyst, HDS catalyst, and HDA catalyst may each have a bulk density of from 0.3 grams per milliliter (g/ml) to 1.0 g/ml, such as from 0.4 g/ml to 0.8 g/ml. The hydroprocessing unit 110 may include a volume of HDA catalyst greater than a volume of the HDM catalyst, the HDS catalyst, or the volume of both the HDM catalyst and the HDS catalyst. In some embodiments, the hydroprocessing unit 110 may have a volume ratio of the volume HDA catalyst to the volume of the HDM catalyst and the HDS catalyst of from 1:1 to 6:1, such as from 1:1 to 5:1, from 2:1 to 6:1, from 2:1 to 5:1, from 3:1 to 6:1, or from 3:1 to 5:1. In some embodiments, the hydroprocessing unit 110 may include a volume ratio of the volume of HDA catalyst to the combined volume of the HDM catalyst and the HDS catalyst of about 4:1.

Still referring to FIG. 1, the hydroprocessed effluent 103 is passed out of the hydroprocessing unit 110. In some embodiments, at least 20 wt. % of the hydroprocessed effluent 103 may have a boiling point temperature of less than or equal to 225° C. In additional embodiments, at least 5 wt. %, at least 10 wt. %, at least 20 wt. %, or even at least 30 wt. % of the hydroprocessed effluent 103 may have a boiling point temperature of less than or equal to 250° C. The hydroprocessed effluent 103 may be characterized by a T5 temperature, which is the temperature below which 5% of the constituents boil. In some embodiments, the hydroprocessed effluent 103 may have a T5 temperature of less than or equal to 140° C., less than or equal to 130° C., less than or equal to 120, less than or equal to 110, or even less than or equal to 100° C. The hydroprocessed effluent 103 may also be characterized by a T95 temperature, which is the temperature at which 95% of the constituents of the hydroprocessed effluent 103 boil. In some embodiments, the hydroprocessed effluent 103 may have a T95 temperature of greater than or equal to 520° C., greater than or equal to 530° C., greater than or equal to 540° C., greater than or equal to 550° C., even greater than or equal to 560° C., or even greater than or equal to 570° C. In some embodiments, the hydroprocessed effluent 103 may have a final boiling point (FBP) temperature of greater than or equal to 580° C., such as greater than or equal to 590° C., greater than or equal to 600° C., even less than or equal to 610° C.

In some embodiments, the hydroprocessed effluent 103 may have a density less than the density of the crude oil 101. In some embodiments, the hydroprocessed effluent 103 may have a density of from 0.80 grams per milliliter (g/mL) to 0.95 g/mL, such as from 0.80 g/mL to 0.90 g/mL, from 0.80 g/mL to 0.85 g/mL, from 0.82 g/mL to 0.95 g/mL, from 0.82 g/mL to 0.90 g/mL, from 0.82 g/mL to 0.85 g/mL, from 0.83 g/mL to 0.95 g/mL, 0.83 g/mL to 0.90 g/mL, or from 0.83 g/mL to 0.85 g/mL. The hydroprocessed effluent 103 may have an API gravity greater than the API gravity of the crude oil 101 introduced to the hydroprocessing unit 110. In some embodiments, the hydroprocessed effluent 103 may have an API gravity of less than or equal to 50 degrees, or less than or equal to 40 degrees. In some embodiments, the hydroprocessed effluent 103 may have an API from 25 degrees to 29 degrees. The hydroprocessed effluent 103 may have a sulfur content less than a sulfur content of the crude oil 101 introduced to the hydroprocessing unit 110. In some embodiments, the hydroprocessed effluent 103 may have a sulfur content of from 0.001 wt. % to 0.10 wt. %, such as from 0.01 wt. % to 0.08 wt. %, from 0.01 wt. % to 0.05 wt. %, from 0.02 wt. % to 0.10 wt. %, from 0.02 wt. % to 0.08 wt. %, or from 0.02 wt. % to 0.07 wt. %. The hydroprocessed effluent 103 may have a nitrogen content less than the nitrogen content of the crude oil 101. In some embodiments, the hydroprocessed effluent 103 may have a nitrogen content of from 0 parts per million by weight (ppmw) to 500 ppmw, such as from 10 ppmw to 500 ppmw, from 10 ppmw to 400 ppmw, from 10 ppmw to 300 ppmw, from 50 ppmw to 500 ppmw, from 50 ppmw to 400 ppmw, or from 50 ppmw to 300 ppmw.

The hydroprocessed effluent 103 may have a metals content that is less than the metals content of the crude oil 101 introduced to the hydroprocessing unit 110. In some embodiments, the hydroprocessed effluent 103 may have a metals content of from 0 ppmw to 100 ppmw, such as from 0 ppmw to 75 ppmw, from 0 ppmw to 50 ppmw, from 0 ppmw to 25 ppmw, from 0 ppmw to 10 ppmw, from 0 ppmw to 5 ppmw, from 0.1 ppmw to 100 ppmw, from 0.1 ppmw to 75 ppmw, from 0.1 ppmw to 50 ppmw, from 0.1 ppmw to 25 ppmw, from 0.1 ppmw to 10 ppmw, or from 0.1 ppmw to 5 ppmw. The hydroprocessed effluent 103 may have a nickel content that is less than a nickel content of the crude oil 101 introduced to the hydroprocessing unit 110. In some embodiments, the hydroprocessed effluent 103 may have a nickel content of from 0 ppmw to 10 ppmw, such as from 0 ppmw to 7.5 ppmw, from 0 ppmw to 5 ppmw, from 0 ppmw to 2.5 ppmw, from 0 ppmw to 1 ppmw, from 0 ppmw to 0.5 ppmw, from 0.1 ppmw to 10 ppmw, from 0.1 ppmw to 7.5 ppmw, from 0.1 ppmw to 5 ppmw, from 0.1 ppmw to 2.5 ppmw, from 0.1 ppmw to 1 ppmw, or from 0.1 ppmw to 0.5 ppmw. The hydroprocessed effluent 103 may have a vanadium content that is less than a vanadium content of the crude oil 101 introduced to the hydroprocessing unit 110. In some embodiments, the hydroprocessed effluent 103 may have a vanadium content of from 0 ppmw to 10 ppmw, such as from 0 ppmw to 7.5 ppmw, from 0 ppmw to 5 ppmw, from 0 ppmw to 2.5 ppmw, from 0 ppmw to 1 ppmw, from 0 ppmw to 0.5 ppmw, from 0.1 ppmw to 10 ppmw, from 0.1 ppmw to 7.5 ppmw, from 0.1 ppmw to 5 ppmw, from 0.1 ppmw to 2.5 ppmw, from 0.1 ppmw to 1 ppmw, or from 0.1 ppmw to 0.5 ppmw.

The hydroprocessed effluent 103 may have an iron content that is less than an iron content of the crude oil 101 introduced to the hydroprocessing unit 110. In some embodiments, the hydroprocessed effluent 103 may have an iron content of from 0 ppmw to 10 ppmw, such as from 0 ppmw to 7.5 ppmw, from 0 ppmw to 5 ppmw, from 0 ppmw to 2.5 ppmw, from 0 ppmw to 1 ppmw, from 0 ppmw to 0.5 ppmw, from 0.1 ppmw to 10 ppmw, from 0.1 ppmw to 7.5 ppmw, from 0.1 ppmw to 5 ppmw, from 0.1 ppmw to 2.5 ppmw, from 0.1 ppmw to 1 ppmw, or from 0.1 ppmw to 0.5 ppmw. The hydroprocessed effluent 103 may have a sodium content that is less than a sodium content of the crude oil 101 introduced to the hydroprocessing unit 110. In some embodiments, the hydroprocessed effluent 103 may have a sodium content of from 0 ppmw to 10 ppmw, such as from 0 ppmw to 7.5 ppmw, from 0 ppmw to 5 ppmw, from 0 ppmw to 2.5 ppmw, from 0 ppmw to 1 ppmw, from 0 ppmw to 0.5 ppmw, from 0.1 ppmw to 10 ppmw, from 0.1 ppmw to 7.5 ppmw, from 0.1 ppmw to 5 ppmw, from 0.1 ppmw to 2.5 ppmw, from 0.1 ppmw to 1 ppmw, or from 0.1 ppmw to 0.5 ppmw.

Referring still to FIG. 1, in some embodiments, the hydroprocessed effluent 103 may be passed from the hydroprocessing unit 110 to the HS-FCC unit 120. In some embodiments, the hydroprocessed effluent 103 may be passed directly from the hydroprocessing unit 110 to the HS-FCC unit 120 without subjecting the hydroprocessed effluent 103 to an intervening unit operation, such as a separation, that changes the composition of the hydroprocessed effluent 103. In some embodiments, the hydroprocessed effluent 103 may be passed through a heat exchanger, compressor, analyzer, or other system component that does not change the composition of the hydroprocessed effluent 103 before being passed to the HS-FCC unit 120. In some embodiments, the crude oil upgrading system 100 may include a conduit 166 extending directly from an outlet 164 of the hydroprocessing unit 110 to an inlet 168 of the HS-FCC unit 120. The conduit 166 may be operable to transport the hydroprocessed effluent 103 directly from the outlet 164 of the hydroprocessing unit 110 to the inlet 168 of the HS-FCC unit 120 without passing through a separation device or other unit operation operable to change a composition of the hydroprocessed effluent 103. In some embodiments, the entire hydroprocessed effluent 103 may be passed from the hydroprocessing unit 110 to the HS-FCC unit 120. In some embodiments, one or more slip streams having the same composition as the hydroprocessed effluent 103 may be removed from the hydroprocessed effluent 103 between the hydroprocessing unit 110 and the HS-FCC unit 120 without changing the composition of the hydroprocessed effluent 103.

The HS-FCC unit 120 may be operable to contact the hydroprocessed effluent 103 with a cracking catalyst under high-severity conditions to crack at least a portion of the hydroprocessed effluent 103 to produce a cracked effluent 104 comprising at least one product. In some embodiments, the entire hydroprocessed effluent 103 may be contacted with the cracking catalyst under high-severity conditions in the HS-FCC unit 120. Although the entire hydroprocessed effluent 103 may be contacted with the cracking catalyst, in some embodiments, only a portion of the hydroprocessed effluent 103 may undergo cracking in the HS-FCC unit 120. The HS-FCC unit 120 may include a catalyst-feed mixing zone 121, a reaction zone 122, a separation zone 123, and a catalyst regeneration zone 124. The hydroprocessed effluent 103 may be passed to the catalyst-feed mixing zone 121, where it is mixed with regenerated cracking catalyst from HS-FCC catalyst composition 125 passed from the catalyst regeneration zone 124 to form a mixture comprising the hydroprocessed effluent 103 and the cracking catalyst.

A variety of fluid catalytic cracking catalysts may be suitable for the reactions of the HS-FCC unit 120. The HS-FCC catalyst composition 125 of the present disclosure includes a nano-ZSM-5 zeolite and a Y-type zeolite, where the nano-ZSM-5 has an average particle size of from 0.01 µm to 0.2 µm. The HS-FCC catalyst composition 125 can also include an alumina binder, a matrix material comprising Kaolin clay, and colloidal silica.

The nano-ZSM-5 zeolite in the HS-FCC catalyst composition 125 may be operable to crack at least a portion of the hydrocarbon feed, to produce one or more light olefins, such as ethylene and propylene. Without being bound by any particular theory, it is believed that the nano-ZSM-5 zeolite may have a greater propensity to crack the relatively lighter hydrocarbons, such as those present in the hydroprocessed effluent 103 and those produced by the catalytic cracking of heavier hydrocarbons by the Y-type zeolite. As a result, the inclusion of the nano-ZSM-5 zeolite may increase the yield of products, such as light olefins, when compared to HS-FCC catalysts that do not include the nano-ZSM-5 zeolite. Further, the HS-FCC catalyst composition 125 that includes the nano-ZSM-5 zeolite may have reduced coke formation during steady-state operation of the crude oil upgrading system 100, when compared to HS-FCC catalyst compositions that include ZSM-5 zeolites with an average particle size greater than 0.2 µm. As used in the present disclosure, "ZSM-5" refers to zeolites having a modernite framework inverted (MFI) type according to the IUPAC zeolite nomenclature and consisting of silica and alumina. ZSM-5 refers to "Zeolite Socony Mobil-5" and is a pentasil family zeolite that can be represented by the chemical formula $Na_nAl_nSi_{96-n}O_{192} \cdot 16H_2O$, where 0<n<27. The molar ratio of silica to alumina in the ZSM-5 may be at least 5, at least 10, at least 25, at least 30 or even at least 50. In embodiments, the molar ratio of silica to alumina in the ZSM-5 may be from 5 to 50, from 5 to 40, from 5 to 35, from 10 to 50, from 10 to 40, from 10 to 35, from 20 to 50, from 20 to 40, from 20 to 35, from 30 to 50, or from 30 to 40. As used in the present disclosure, "nano-ZSM-5" refers to ZSM-5 zeolites having an average particle size of from 0.01 µm to 0.2 µm, as determined by electron microscopy.

In embodiments, the nano-ZSM-5 zeolite can have an average surface area from 200 meters squared per gram ($m^2/g$) to 800 $m^2/g$. In embodiments, the average surface area can be from 200 $m^2/g$ to 400 $m^2/g$, from 200 $m^2/g$ to 600 $m^2/g$, from 200 $m^2/g$ to 800 $m^2/g$, from 300 $m^2/g$ to 400 $m^2/g$, from 300 $m^2/g$ to 600 $m^2/g$, from 300 $m^2/g$ to 800 $m^2/g$, from 400 $m^2/g$ to 600 $m^2/g$, or from 400 $m^2/g$ to 800 $m^2/g$. In embodiments, the nano-ZSM-5 zeolite, can have an average total pore volume per unit weight of the nano-ZSM-5 zeolite of from 0.010 milliliters per gram (mL/g) to 0.500 mL/g, such as from 0.050 mL/g to 0.500 mL/g, from 0.010 mL/g to 0.300 mL/g, or from 0.050 mL/g to 0.300 mL/g.

In embodiments, the nano-ZSM-5 zeolite can have an average particle size of from 0.01 µm to 0.2 µm, as determined by electron microscopy. In embodiments, the average particle size of the nano-ZSM-5 zeolite can be from 0.01 µm to 0.15 µm, from 0.01 µm to 0.125 µm, from 0.01 µm to 0.1 µm, from 0.01 µm to 0.09 µm, from 0.05 µm to 0.15 µm, from 0.05 µm to 0.125 µm, from 0.05 µm to 0.1 µm, from 0.05 µm to 0.09 µm, or from 0.08 µm to 0.09 µm. In embodiments, the nano-ZSM-5 zeolites can be generally spherical and can have an average particle diameter of from 0.01 µm to 0.15 µm, from 0.01 µm to 0.125 µm, from 0.01 µm to 0.1 µm, from 0.01 µm to 0.09 µm, from 0.05 µm to 0.15 µm, from 0.05 µm to 0.125 µm, from 0.05 µm to 0.1 µm, from 0.05 µm to 0.09 µm, or from 0.08 µm to 0.09 µm, as determined by electron microscopy. Without intending to be bound by any particular theory, it is believed that ZSM-5 zeolites with an average particle diameter or average particle size greater than 0.2 µm can have a crystal size more similar to the molecular diameter of light hydrocarbons, when compared to nano-ZSM-5 zeolites with an average particle size less than or equal to 0.2 µm. It is further believed that diffusion of reactant and product molecules within micropores of the ZSM-5 zeolite may be a rate-limiting step of catalytic reactions when the crystal size of the ZSM-5 zeolite is similar to the molecular diameter of light hydrocarbons produced from the catalytic reactions, which can increase coke formation on the ZSM-5 zeolite. Thus, it is believed that the HS-FCC catalyst composition 125 that includes the nano-ZSM-5 zeolite with an average particle size of from 0.01 µm to 0.20 µm can exhibit reduced coke formation and reduced deactivation, when compared to HS-FCC catalyst compositions that include a ZSM-5 zeolite with an average particle size of greater than 0.2 µm.

In embodiments, one or more of the zeolitic components of the HS-FCC catalyst composition 125 can include one or more phosphorous-containing compounds, such as phosphorous pentoxide ($P_2O_5$). Without being bound by any particular theory, it is believed that phosphorus-containing compounds may stabilize the structure of the zeolitic framework structure by preventing the segregation of the framework alumina, which can improve the hydrothermal stability of the zeolitic component. This may reduce the dealumination of the zeolitic component that occurs during steaming, which can lead to a reduction in acidity and catalytic activity of the zeolitic component. In embodiments, one or more of the zeolitic components of the HS-FCC catalyst composition 125 may include one or more phosphorous-containing compounds in an amount of from 1 wt. % to 20 wt. % based on the total weight of each zeolitic component. In embodiments, the phosphorous-containing compounds can be impregnated onto the nano-ZSM-5 zeolite so that the nano-ZSM-5 zeolite is impregnated with from 1 wt. % to 20 wt. % phosphorous-containing compounds based on the total weight of the nano-ZSM-5 zeolite. In embodiments, the nano-ZSM-S zeolite can be impregnated with from 1 wt. % to 20 wt. % phosphorous pentoxide based on the total weight of the nano-ZSM-5 zeolite. In embodiments, the nano-ZSM-5 zeolite can include from 1 wt. % to 15 wt. %, from 1 wt. % to 10 wt. %, from 1 wt. % to 5 wt. %, from 5 wt. % to 20 wt. %, from 5 wt. % to 15 wt. %, from 5 wt. % to 10 wt. %, from 10 wt. % to 20 wt. %, from 10 wt. % to 15 wt. %, from 15 wt. % to 20 wt. %, from 6 wt. % to 9 wt. %, or from 7 wt. % to 8 wt. % phosphorous pentoxide based on the total weight of the nano-ZSM-5 zeolite. In embodiments, the nano-ZSM-5 zeolite can include about 7.5 wt. % phosphorous pentoxide based on the total weight of the nano-ZSM-5 zeolite.

In embodiments, the HS-FCC catalyst composition 125 can include up to 40 wt. % of a nano-ZSM-5 zeolite based on the total weight the HS-FCC catalyst composition 125. In embodiments, the HS-FCC catalyst composition 125 can include up to 30 wt. %, up to 25 wt. %, or up to 20 wt. % of the nano-ZSM-5 zeolite based on the total weight of the HS-FCC catalyst composition 125. In embodiments, the HS-FCC catalyst composition 125 can include from 1 wt. % to 40 wt. %, from 1 wt. % to 30 wt. %, from 1 wt. % to 25 wt. %, from 1 wt. % to 20 wt. %, 5 wt. % to 40 wt. %, from 5 wt. % to 30 wt. %, from 5 wt. % to 25 wt. %, from 5 wt. % to 20 wt. %, 10 wt. % to 40 wt. %, from 10 wt. % to 30 wt. %, from 10 wt. % to 25 wt. %, from 10 wt. % to 20 wt. %, from 15 wt. % to 40 wt. %, from 15 wt. % to 30 wt. %, from 15 wt. % to 25 wt. %, or from 15 wt. % to 20 wt. % of the nano-ZSM-5 zeolite based on the total weight of the HS-FCC catalyst composition 125.

The Y-type zeolite of the HS-FCC catalyst composition 125 can operate to produce one or more olefins from the hydrocarbons in the hydroprocessed effluent 103. In embodiments, the Y-type zeolite can comprise an ultrastable Y-type (USY) zeolite. USY zeolites can be produced via the dealumination of one or more Y-type zeolites. As used in the present disclosure, the term "Y-type zeolite" refers to a zeolite having a Faujasite (FAU) framework type according to the IUPAC zeolite nomenclature and consisting of silica and alumina. Without being bound by any particular theory, it is believed that the dealumination of the Y-type zeolite may result in a USY zeolite having a reduced number of acid sites. This reduced number of acid sites may result in a reduction of the rates of secondary reactions in the HS-FCC unit 120, such as the dehydrogenation or hydrogenation of olefins produced in the HS-FCC unit 120, when compared to Y-type zeolite that has not been dealuminated. As a result, USY zeolite may produce a greater yield of olefins when compared to Y-type zeolite.

The molar ratio of silica to alumina in the USY zeolite can be greater than or equal to 5, greater than or equal to 10, greater than or equal to 25, or even greater than or equal to 50. In embodiments, the molar ratio of silica to alumina in the USY zeolite can be from 5 to 50, from 5 to 25, from 5 to 10, from 10 to 50, from 10 to 25, or from 25 to 50. In embodiments, the molar ratio of silica to alumina in the USY zeolite can be about 30. In embodiments, the USY zeolite can also comprise one or more transition metals, such as zirconium, titanium, or hafnium, substituted into the framework of the zeolite. The USY zeolite can have an average surface area of from 200 m$^2$/g to 900 m$^2$/g. In embodiments, the USY zeolite may have an average surface area of from 200 m$^2$/g to 800 m$^2$/g, from 300 m$^2$/g to 900 m$^2$/g, from 300 m$^2$/g to 800 m$^2$/g, from 500 m$^2$/g to 900 m$^2$/g, or from 500 m$^2$/g to 800 m$^2$/g. The USY zeolite may have an average total pore volume per unit weight of the USY zeolite of from 0.050 mL/g to 0.600 mL/g, such as from 0.050 mL/g to 0.500 mL/g.

In embodiments, one or more of the zeolitic components of the HS-FCC catalyst composition 125 can include one or more rare earth metals or rare earth metal oxides, where the rare earth metal can be one or more of lanthanum, cerium, dysprosium, europium, gadolinium, holmium, lutetium, neodymium, praseodymium, promethium, samarium, scandium, terbium, thulium, ytterbium, yttrium, or combinations of these. Without being bound by any particular theory, it is believed that rare earth metals or metal oxides can improve the stability of the unit cells of the zeolitic component, increase the catalytic activity of the zeolitic component, or both. Moreover, it is believed that rare earth metals or metal oxides can function as vanadium traps, which act to sequester vanadium in the feed and prevent deleterious effects that vanadium can have on the zeolitic components of the catalyst. In embodiments, one or more of the zeolitic components of the HS-FCC catalyst composition 125 can include one or more rare earth metals in an amount of from 1 wt. % to 5 wt. % based on the total weight of each zeolitic component. In embodiments, one or more of the zeolitic components of the HS-FCC catalyst composition 125 can be impregnated with lanthanum or lanthanum oxide. In embodiments, one or more of the zeolitic components of the HS-FCC catalyst composition 125 can include one or more lanthanum-containing compounds, such as but not limited to lanthanum oxide, in an amount of from 1 wt. % to 5 wt. %, from 1 wt. % to 4 wt. %, from 1 wt. % to 3 wt. %, from 1 wt. % to 2 wt. %, from 2 wt. % to 5 wt. %, from 2 wt. % to 4 wt. %, from 2 wt. % to 3 wt. %, from 3 wt. % to 5 wt. %, from 3 wt. % to 4 wt. %, or from 4 wt. % to 5 wt. % based on the total weight of each zeolitic component.

In embodiments, the rare earth or rare earth oxide can be impregnated on the USY zeolite of the HS-FCC catalyst composition 125. In embodiments, the HS-FCC catalyst composition 125 can comprise USY zeolite impregnated with lanthanum oxide ($La_2O_3$). In embodiments, the USY zeolite can include from 1 wt. % to 5 wt. %, from 1 wt. % to 4 wt. %, from 1 wt. % to 3 wt. %, from 1 wt. % to 2 wt. %, from 2 wt. % to 5 wt. %, from 2 wt. % to 4 wt. %, from 2 wt. % to 3 wt. %, from 3 wt. % to 5 wt. %, from 3 wt. % to 4 wt. %, or from 4 wt. % to 5 wt. % lanthanum oxide based on the total weight of the USY zeolite. In embodiments, the USY zeolite can comprise about 2.5 wt. % lanthanum oxide based on the total weight of the USY zeolite.

In embodiments, the HS-FCC catalyst composition 125 can include up to 40 wt. % USY zeolite based on the total weight the HS-FCC catalyst composition 125. In embodiments, the HS-FCC catalyst composition 125 can include up to 30 wt. %, or up to 25 wt. % USY zeolite based on the total weight of the HS-FCC catalyst composition 125. In embodiments, the HS-FCC catalyst composition 125 can include from 1 wt. % to 40 wt. %, from 1 wt. % to 30 wt. %, from 1 wt. % to 25 wt. %, from 5 wt. % to 40 wt. %, from 5 wt. % to 30 wt. %, from 5 wt. % to 25 wt. %, from 10 wt. % to 40 wt. %, from 10 wt. % to 30 wt. %, from 10 wt. % to 25 wt. %, from 15 wt. % to 40 wt. %, from 15 wt. % to 30 wt. %, or from 15 wt. % to 25 wt. % USY zeolite based on the total weight of the HS-FCC catalyst composition 125.

In embodiments, the HS-FCC catalyst composition 125 can include one or more binder materials, such as alumina-containing compounds or silica-containing compounds (including compounds containing alumina and silica). As used in the present disclosure, "binder materials" refer to materials that serve to "glue" or otherwise hold components of the HS-FCC catalyst composition 125. Binder materials can be included to improve the attrition resistance of the HS-FCC catalyst composition 125. The binders can comprise alumina (such as amorphous alumina), silica-alumina (such as amorphous silica-alumina), or silica (such as amorphous silica). According to one or more embodiments, the binder material can comprise pseudoboehmite. As used in the present disclosure, "pseudoboehmite" refers to an aluminum-containing compound with the chemical composition AlO(OH) consisting of crystalline boehmite. While boehmite generally refers to aluminum oxide hydroxide as well, pseudoboehmite generally has a greater amount of water than boehmite. In embodiments, the binder material can comprise amorphous silica. The amorphous silica can be in the form of colloidal silica. As used throughout the present disclosure, the term "colloidal silica" refers to nano-sized particles of amorphous, non-porous silica. In embodiments, the HS-FCC catalyst composition 125 can comprise an alumina binder, colloidal silica, or both.

In embodiments, the HS-FCC catalyst composition 125 can include the one or more binders in an amount of from 5 wt. % to 30 wt. % based on the total weight of the HS-FCC catalyst composition 125. In embodiments, the HS-FCC catalyst composition 125 can include the one or more binders in an amount of from 5 wt. % to 25 wt. %, from 5 wt. % to 20 wt. %, from 5 wt. % to 15 wt. %, from 5 wt. % to 10 wt. %, from 10 wt. % to 25 wt. %, from 10 wt. % to 20 wt. %, from 10 wt. % to 15 wt. %, from 15 wt. % to 30 wt. %, from 15 wt. % to 25 wt. %, from 15 wt. % to 20 wt. %, from 20 wt. % to 30 wt. %, from 20 wt. % to 25 wt. %, or from 25 wt. % to 30 wt. % based on the total weight of the HS-FCC catalyst composition 125.

In embodiments, the HS-FCC catalyst composition 125 can include an alumina binder in an amount of from 2 wt. % to 20 wt. % based on the total weight of the HS-FCC catalyst composition 125. In embodiments, the HS-FCC catalyst composition 125 can include the alumina binder in an amount of from 2 wt. % to 15 wt. %, from 2 wt. % to 10 wt. %, from 5 wt. % to 20 wt. %, from 5 wt. % to 15 wt. %, from 5 wt. % to 10 wt. %, or from 7 wt. % to 9 wt. % based on the total weight of the HS-FCC catalyst composition 125. In embodiments the HS-FCC catalyst composition 125 can include about 8 wt. % alumina binder based on the total weight of the HS-FCC catalyst composition 125.

In embodiments, the HS-FCC catalyst composition 125 can include colloidal silica in an amount of from 0.5 wt. % to 5 wt. % based on the total weight of the HS-FCC catalyst composition 125. In embodiments, the HS-FCC catalyst composition 125 can include colloidal silica in an amount of from 0.5 wt. % to 4 wt. %, from 0.5 wt. % to 3 wt. %, from 0.5 wt. % to 2 wt. %, from 1 wt. % to 4 wt. %, from 1 wt. % to 3 wt. %, from 1 wt. % to 2 wt. %, from 2 wt. % to 4 wt. %, or from 2 wt. % to 3 wt. % based on the total weight of the HS-FCC catalyst composition 125. In embodiments the HS-FCC catalyst composition 125 can include about 2 wt. % colloidal silica based on the total weight of the HS-FCC catalyst composition 125. Without intending to be bound by any particular theory, it is believed that the colloidal silica can act as a binder and/or filler to provide additional physical strength and integrity to the HS-FCC catalyst. Further, it is believed that the addition of colloidal silica to the HS-FCC catalyst can improve the attrition resistance and/or stabilize catalytic activity of the HS-FCC catalyst.

In embodiments, the HS-FCC catalyst composition 125 may include one or more matrix materials, which may include one or more clay materials, such as but not limited to Kaolin clay. Without being bound by any particular theory, it is believed that the matrix materials of the HS-FCC catalyst composition 125 can serve both physical and catalytic functions. Physical functions can include providing particle integrity and attrition resistance, acting as a heat transfer medium, and providing a porous structure to allow diffusion of hydrocarbons into and out of the catalyst microspheres. The matrix materials can also affect catalyst selectivity, product quality, and resistance to poisons. The matrix materials may tend to exert its strongest influence on overall catalytic properties for those reactions that directly involve relatively large molecules.

In embodiments, the matrix materials can include Kaolin clay. As used in the present disclosure, "Kaolin clay" refers to a clay material that has a relatively large amount (such as at least about 50 wt. %, at least 60 wt. %, at least 70 wt. %, at least 80 wt. %, at least 90 wt. %, or at least 95 wt. %) of kaolinite, which can be represented by the chemical formula $Al_2Si_2O_5(OH)_4$. In embodiments, the HS-FCC catalyst composition 125 can include one or more matrix materials in an amount of from 30 wt. % to 60 wt. % based on the total weight of each of the HS-FCC catalyst composition 125. In embodiments, the HS-FCC catalyst composition 125 can include from 30 wt. % to 55 wt. %, from 30 wt. % to 50 wt. %, from 30 wt. % to 45 wt. %, from 30 wt. % to 40 wt. %, from 30 wt. % to 35 wt. %, from 35 wt. % to 60 wt. %, from 35 wt. % to 55 wt. %, from 35 wt. % to 50 wt. %, from 35 wt. % to 45 wt. %, from 35 wt. % to 40 wt. %, from 40 wt. % to 60 wt. %, from 40 wt. % to 55 wt. %, from 40 wt. % to 50 wt. %, from 40 wt. % to 45 wt. %, from 45 wt. % to 60 wt. %, from 45 wt. % to 55 wt. %, from 45 wt. % to 50 wt. %, from 50 wt. % to 60 wt. %, from 50 wt. % to 55 wt. %, or from 55 wt. % to 60 wt. % matrix materials based on the total weight of the HS-FCC catalyst composition 125.

In embodiments, the HS-FCC catalyst composition 125 can include nano-ZSM-5 zeolite impregnated with phosphorous, a USY zeolite impregnated with lanthanum oxide, an alumina binder, a matrix material comprising Kaolin clay, and colloidal silica. In embodiments, the nano-ZSM-5 zeolite can be impregnated with 7.5 wt. % phosphorous pentoxide based on the total weight of the nano-ZSM-5 zeolite. In embodiments the USY zeolite can be impregnated with 2.5 wt. % lanthanum oxide, based on the total weight of the USY zeolite.

In embodiments, the HS-FCC catalyst composition 125 can comprise 20 wt. % nano-ZSM-5 zeolite based on the total weight of the HS-FCC catalyst composition 125, where the nano-ZSM-5 zeolite is impregnated with 7.5 wt. % $P_2O_5$ based on the total weight of the nano-ZSM-S zeolite; 21 wt. % USY zeolite based on the total weight of the HS-FCC catalyst composition 125, where the USY zeolite is impregnated with 2.5 wt. % lanthanum oxide ($La_2O_3$) based on the total weight of the USY zeolite; 8 wt. % alumina binder based on the total weight of the HS-FCC catalyst composition 125; 49 wt. % Kaolin clay based on the total weight of the HS-FCC catalyst composition 125; 2 wt. % colloidal silica based on the total weight of the HS-FCC catalyst composition 125. In embodiments, the HS-FCC catalyst composition 125 can comprise a plurality of catalyst particles, where each of the plurality of catalyst particles comprises the nano-ZSM-S zeolite impregnated with phosphorous pentoxide, the USY zeolite impregnated with lanthanum oxide, the alumina binder, the Kaolin clay, and the colloidal silica.

The HS-FCC catalyst composition 125 can be formed by a variety of processes. According to one embodiment, the matrix material can be mixed with a fluid such as water to form a slurry, and the zeolites can be separately mixed with a fluid such as water to form a slurry. The matrix material slurry and the zeolite slurry can be combined under stirring. Separately, another slurry can be formed by combining the binder material with a fluid such as water. The binder slurry can then be combined with the slurry containing the zeolites and matrix material to form a final slurry. The final slurry can then be dried, for example by spraying, and then calcined to produce the microparticles of the cracking catalyst.

In embodiments, the HS-FCC catalyst composition 125 can be in the form of shaped microparticles, such as microspheres. As used in the present disclosure, "microparticles" refer to particles having an average particle size of from 0.1 microns and 100 microns. The size of a microparticle refers to the maximum length of a particle from one side to another, measured along the longest distance of the microparticle. For instance, a spherically shaped microparticle has a size equal to its diameter, or a rectangular prism shaped microparticle has a maximum length equal to the hypotenuse stretching from opposite corners. In embodiments, each zeolitic component of the HS-FCC catalyst composition 125 can be included in each catalyst microparticle. However, in other embodiments, microparticles can be mixed, where the microparticles contain only a portion of the HS-FCC catalyst composition 125. For instance, a mixture of two microparticle types may be included in the HS-FCC catalyst composition 125, where one type of microparticle includes only the nano-ZSM-5 zeolite, and another type of microparticle includes only the USY zeolite.

Referring still to FIG. 1, in some embodiments, the mixture comprising the hydroprocessed effluent 103 and cracking catalyst may be passed to the reaction zone 122, in which at least a portion of the hydroprocessed effluent 103 may undergo cracking to form one or more chemical products or intermediates. In some embodiments, the reaction zone 122 may be a down-flow reaction zone in which the mixture of hydroprocessed effluent 103 and cracking catalyst are passed downward (i.e., in the −Z direction of the coordinate axis in FIG. 1) through the reaction zone 122. Although described in the context of a down-flow reaction zone, it is understood that the HS-FCC unit 120 may include a reaction zone 122 that is an up-flow reaction zone or any other type of reaction zone.

The HS-FCC unit 120 in FIG. 1 is a simplified schematic of one particular embodiment of a HS-FCC unit, and it is understood that other configurations of HS-FCC units may be suitable for incorporation into the crude oil upgrading system 100. The HS-FCC unit 120 may be operable to contact the hydroprocessed effluent 103 with the cracking catalyst under high-severity conditions. As used herein, the term "high severity" refers to reaction conditions that include a reaction temperature of greater than or equal to 500° C., a weight ratio of cracking catalyst to reactant (such as the hydroprocessed effluent 103) of at least 2:1, and a residence time of the reactants (hydroprocessed effluent 103) in contact with the cracking catalyst at the reaction temperature of less than or equal to 30 seconds. In some embodiments, the HS-FCC unit 120 may be operated at a reaction temperature of at least 500° C., at least 550° C., at least 600° C., at least 650° C., at least 700° C., or even at least 750° C. In some embodiments, the reaction temperature in the HS-FCC unit may be from 500° C. to 800° C., from 500° C. to 700° C., from 500° C. to 650° C., from 500° C. to 600° C., from 550° C. to 800° C., from 550° C. to 700° C., from 550° C. to 650° C., from 550° C. to 600° C., from 600° C. to 800° C., from 600° C. to 700° C., or from 600° C. to 650° C.

In some embodiments, the weight ratio of cracking catalyst to hydroprocessed effluent 103 in the HS-FCC unit 120 at least 2:1, at least 3:1, at least 4:1, at least 5:1, at least 6:1, at least 7:1, or even at least 10:1. In some embodiments, the weight ratio of the cracking catalyst to the hydroprocessed effluent 103 in the HS-FCC unit 120 may be from 2:1 to 40:1, from 2:1 to 30:1, from 2:1 to 20:1, from 2:1 to 10:1, from 4:1 to 40:1, from 4:1 to 30:1, from 4:1 to 20:1, from 4:1 to 10:1, from 6:1 to 40:1, from 6:1 to 30:1, from 6:1 to 20:1, from 6:1 to 10:1, from 8:1 to 40:1, from 8:1 to 30:1, from 8:1 to 20:1, from 8:1 to 10:1, from 10:1 to 40:1, from 10:1 to 30:1, from 10:1 to 20:1, or from 20:1 to 40:1.

In some embodiments, the residence time of the hydroprocessed effluent 103 in contact with the cracking catalyst at the reaction temperature in the HS-FCC unit 120 may be less than 30 seconds (sec), less than 25 sec, less than 20 sec, less than 15 sec, less than 10 sec, less than 5 sec, less than 2.5 sec, less than 1 sec, or less than 0.5 sec. In some embodiments, the residence time of the hydroprocessed effluent 103 in contact with the cracking catalyst at the reaction temperature in the HS-FCC unit 120 may be from 0.2 sec to 30 sec, from 0.2 sec to 25 sec, from 0.2 sec to 20 sec, from 0.2 sec to 15 sec, from 0.2 sec to 10 sec, from 0.2 sec to 5 sec, from 0.2 sec to 2.5 sec, from 0.2 sec to 1 sec, from 0.2 sec to 0.5 sec, from 0.5 sec to 30 sec, from 1 sec to 30 sec, or from 2.5 sec to 30 sec, from 5 sec to 30 sec, from 10 sec to 30 sec, from 15 sec to 30 sec, from 20 sec to 30 sec, or from 25 sec to 30 sec.

Following the cracking reaction in the reaction zone 122, the contents of the reaction zone 122 may be passed to the separation zone 123 where the cracked product of the reaction zone 122 is separated from spent catalyst, which is passed in a spent catalyst stream 126 to the catalyst regeneration zone 124 where it is regenerated by, for example, removing coke from the spent catalyst. The cracked effluent 104 may be passed out of the separation zone 123.

Figure 2:
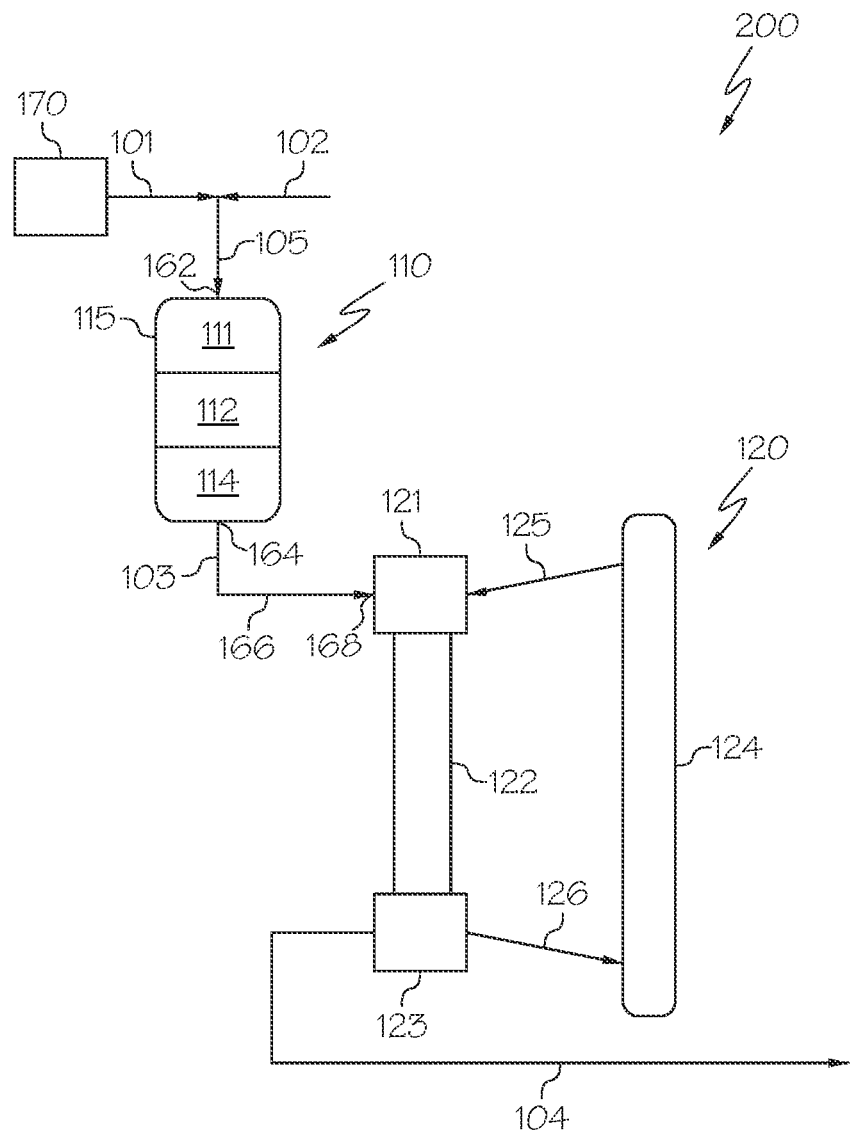
FIG. 2 depicts a generalized schematic diagram of the crude oil upgrading system of FIG. 1, in which the hydroprocessing unit includes an HDM catalyst, an HDS catalyst, and an HDA catalyst disposed in separate catalyst zones within a single reactor, according to one or more embodiments described in this disclosure.

Referring now to FIG. 2, the hydroprocessing unit 110 may include a plurality of packed bed reaction zones arranged in series in a single hydroprocessing reactor 115. For example, in some embodiments, the hydroprocessing unit 110 may include an HDM reaction zone 111, an HDS reaction zone 112, and an HDA reaction zone 114. In some embodiments, each of the HDM reaction zone 111, the HDS reaction zone 112, and the HDA reaction zone 114 may include a catalyst bed. In some embodiments, each of the HDM reaction zone 111, the HDS reaction zone 112, and the HDA reaction zone 114 may be contained in a single reactor, such as a hydroprocessing reactor 115, which may be a packed bed reactor with multiple catalyst beds in series. In such embodiments, the hydroprocessing reactor 115 comprises the HDM reaction zone 111 comprising an HDM catalyst, the HDS reaction zone 112 comprising an HDS catalyst, and the HDA reaction zone 114 comprising an HDA catalyst. The hydroprocessing unit 110 may be a downflow reactor, an upflow reactor, a horizontal flow reactor, or reactor with other types of flow patterns. In some embodiments, the hydroprocessing unit 110 may be a downflow column having the HDM reaction zone 111 in a top portion of the column, the HDS reaction zone 112 in a middle portion of the column, and the HDA reaction zone 114 in a bottom portion of the column. It should be understood that contemplated embodiments include those where packed catalyst beds which are arranged in series are contained in a single reactor or in multiple reactors each containing one or more catalyst beds.

According to one or more embodiments, the crude oil 101 may be introduced to the HDM reaction zone 111 and may be contacted by the HDM catalyst. Contacting the crude oil 101 with the HDM catalyst may promote a reaction that removes at least a portion of the metals present in the crude oil 101. Following contact with the HDM catalyst, the crude oil 101 may be converted to an HDM reaction effluent. The HDM reaction effluent may have a reduced metal content as compared to the contents of the crude oil 101. For example, the HDM reaction effluent may have at least 2%, at least 5%, at least 10%, at least 25%, at least 50%, or even at least 75% less metal as the crude oil 101. According to some embodiments, the HDM reaction zone 111 may have a weighted average bed temperature of from 300° C. to 450° C., such as from 370° C. to 415° C., and may have a pressure of from 30 bars to 200 bars, such as from 90 bars to 110 bars. The HDM reaction zone 111 includes the HDM catalyst, and the HDM catalyst may fill the entirety of the HDM reaction zone 111.

The HDM catalyst may comprise one or more metals from the Groups 5, 6, or 8-10 of the IUPAC periodic table. For example, the HDM catalyst may comprise molybdenum. The HDM catalyst may further comprise a support material, and the metal may be disposed on the support material. The support material may be gamma-alumina or silica/alumina extrudates, spheres, cylinders, beads, pellets, and combinations thereof. In some embodiments, the HDM catalyst may comprise a gamma-alumina support, with a surface area of from 100 meters squared per gram ($m^2/g$) to 160 $m^2/g$, such as from 100 $m^2/g$ to 130 $m^2/g$, or from 130 $m^2/g$ to 160 $m^2/g$. In one embodiment, the HDM catalyst may comprise a molybdenum metal catalyst on an alumina support (sometimes referred to as "$Mo/Al_2O_3$ catalyst"). It should be understood throughout this disclosure that metals contained in any of the disclosed catalysts may be present as sulfides or oxides, or even other compounds.

In some embodiments, the HDM catalyst may comprise from 0.5 wt. % to 12 wt. % of an oxide or sulfide of molybdenum, such as from 2 wt. % to 10 wt. % or from 3 wt. % to 7 wt. % of an oxide or sulfide of molybdenum, and from 88 wt. % to 99.5 wt. % of alumina, such as from 90 wt. % to 98 wt. % or from 93 wt. % to 97 wt. % of alumina.

The HDM catalyst can be best described as having a relatively large pore volume, such as at least 0.8 cubic centimeters per gram ($cm^3/g$) (for example, at least 0.9 $cm^3/g$, or even at least 1.0 $cm^3/g$). The pore size of the HDM catalyst may be predominantly macroporous (that is, having a pore size of greater than 50 nanometers (nm)). This may provide a large capacity for the uptake of metals, and optionally dopants, on the surfaces of the HDM catalyst. In one embodiment, the HDM catalyst may include a dopant comprising one or more compounds that include elements selected from the group consisting of boron, silicon, halogens, phosphorus, and combinations thereof.

The HDM reaction effluent may be passed from the HDM reaction zone 111 to the HDS reaction zone 112 where it is contacted with the HDS catalyst. Contacting the HDM reaction effluent with the HDS catalyst may promote a reaction that removes at least a portion of the sulfur present in the HDM reaction effluent stream. Following contact with the HDS catalyst, the HDM reaction effluent may be converted to a HDS reaction effluent. The HDS reaction effluent may have a reduced sulfur content as compared to the HDM reaction effluent. For example, the HDS reaction effluent may have at least 2%, at least 5%, at least 10%, at least 25%, at least 50%, or even at least 75% less sulfur as the HDM reaction effluent. According to some embodiments, the HDS reaction zone 112 may have a weighted average bed temperature of from 300° C. to 450° C., such as from 370° C. to 415° C., and may have a pressure of from 30 bars to 200 bars, such as from 90 bars to 110 bars. The HDS reaction zone 112 includes the HDS catalyst, and the HDS catalyst may fill the entirety of the HDS reaction zone 112.

In one embodiment, the HDS catalyst comprises one metal from Group 6 and one metal from Groups 8-10 of the IUPAC periodic table. Example Group 6 metals include molybdenum and tungsten and examples of Group 8-10 metals include nickel and cobalt. The HDS catalyst may further comprise a support material, and the metal may be disposed on the support material. In some embodiments, the HDS catalyst may comprise Mo and Ni on a alumina support (sometimes referred to as a "$Mo—Ni/Al_2O_3$ catalyst"). The HDS catalyst may also contain a dopant that is selected from the group consisting of boron, phosphorus, halogens, silicon, and combinations thereof. In one or more embodiments, the HDS catalyst may comprise from 10 wt. % to 18 wt. % of an oxide or sulfide of molybdenum, such as from 11 wt. % to 17 wt. % or from 12 wt. % to 16 wt. % of an oxide or sulfide of molybdenum, from 1 wt. % to 7 wt. % of an oxide or sulfide of nickel, such as from 2 wt. % to 6 wt. % or from 3 wt. % to 5 wt. % of an oxide or sulfide of nickel, and from 75 wt. % to 89 wt. % of alumina such as from 77 wt. % to 87 wt. % or from 79 wt. % to 85 wt. % of alumina.

The HDS catalyst may have a surface area of 140 $m^2/g$ to 200 $m^2/g$, such as from 140 $m^2/g$ to 170 $m^2/g$ or from 170 $m^2/g$ to 200 $m^2/g$. The HDS catalyst can have an intermediate pore volume of from 0.5 $cm^3/g$ to 0.7 $cm^3/g$, such as 0.6 $cm^3/g$. The HDS catalyst may generally comprise a mesoporous structure having pore sizes in the range of 12 nm to 50 nm.

The HDS reaction effluent may be passed from the HDS reaction zone 112 to the HDA reaction zone 114 where it is contacted with the HDA catalyst. Contacting the HDS reaction effluent with the HDA catalyst may promote a reaction that may reduce the concentration of aromatics present in the HDS reaction effluent. Following contact with the HDA catalyst, the HDN reaction effluent may be converted to a HDA reaction effluent. The HDA reaction effluent may be passed out of the hydroprocessing unit 110 as the hydroprocessed effluent 103. The hydroprocessed effluent 103 (HDA reaction effluent) may have a reduced content of aromatic compounds compared to the HDS reaction effluent. For example, the hydroprocessed effluent 103 (HDA reaction effluent) may have at least 2%, at least 5%, at least 10%, at least 25%, at least 50%, or even at least 75% less aromatic compounds compared to the HDN reaction effluent.

The HDA catalyst may comprise one or more metals from Groups 5, 6, 8, 9, or 10 of the IUPAC periodic table. In some embodiments, the HDA catalyst may comprise one or more metals from Groups 5 or 6 of the IUPAC periodic table, and one or more metals from Groups 8, 9, or 10 of the IUPAC periodic table. In some embodiments, the HDA catalyst may comprise molybdenum or tungsten from Group 6 and nickel or cobalt from Groups 8, 9, or 10. The HDA catalyst may further comprise a support material, such as zeolite, and the metal may be disposed on the support material. In one embodiment, the HDA catalyst may comprise tungsten and nickel metal catalyst on a zeolite support that is mesoporous (sometimes referred to as "W—Ni/meso-zeolite catalyst"). In another embodiment, the HDA catalyst may comprise molybdenum and nickel metal catalyst on a zeolite support that is mesoporous (sometimes referred to as "Mo—Ni/meso-zeolite catalyst"). The zeolite support material may not be limited to any particular type of zeolite. However, it is contemplated that zeolites such as Y, Beta, AWLZ-15, LZ-45, Y-82, Y-84, LZ-210, LZ-25, Silicalite, or mordenite framework zeolites may be suitable for use in the presently-described HDA catalyst.

The support material (that is, the mesoporous zeolite) of the HDA catalyst may be characterized as mesoporous by having average pore size of from 2 nm to 50 nm. By way of comparison, conventional zeolite-based hydrocracking catalysts contain zeolites which are microporous, meaning that they have an average pore size of less than 2 nm. Without being bound by theory, it is believed that the relatively large-sized pores (that is, mesoporosity) of the presently-described HDA catalysts allow for larger molecules to diffuse inside the zeolite, which is believed to enhance the reaction activity and selectivity of the catalyst. Because of the increased pore size, aromatic-containing molecules can more easily diffuse into the catalyst and aromatic cracking may increase. For example, in some conventional embodiments, the feedstock converted by the hydroprocessing catalysts may be vacuum gas oils; light cycle oils from, for example, a fluid catalytic cracking reactor; or coker gas oils from, for example, a coking unit. The molecular sizes in these oils are relatively small compared to those of heavy oils such as crude and atmosphere residue, which may be the feedstock of the present methods and systems. The crude oils generally are unable to diffuse inside the conventional zeolites and be converted on the active sites located inside the zeolites. Therefore, zeolites with larger pore sizes (that is, mesoporous zeolites) may allow the larger molecules of heavy oils to overcome the diffusion limitation, and may promote the reaction and conversion of the larger molecules of the crude oils.

In one or more embodiments, the HDA catalyst may comprise from 18 wt. % to 28 wt. % of a sulfide or oxide of tungsten, such as from 20 wt. % to 27 wt. % or from 22 wt. % to 26 wt. % of tungsten or a sulfide or oxide of tungsten, from 2 wt. % to 8 wt. % of an oxide or sulfide of nickel, such as from 3 wt. % to 7 wt. % or from 4 wt. % to 6 wt. % of an oxide or sulfide of nickel, and from 5 wt. % to 40 wt. % of mesoporous zeolite, such as from 10 wt. % to 35 wt. % or from 10 wt. % to 30 wt. % of zeolite. In another embodiment, the HDA catalyst may comprise from 12 wt. % to 18 wt. % of an oxide or sulfide of molybdenum, such as from 13 wt. % to 17 wt. % or from 14 wt. % to 16 wt. % of an oxide or sulfide of molybdenum, from 2 wt. % to 8 wt. % of an oxide or sulfide of nickel, such as from 3 wt. % to 7 wt. % or from 4 wt. % to 6 wt. % of an oxide or sulfide of nickel, and from 5 wt. % to 40 wt. % of mesoporous zeolite, such as from 10 wt. % to 35 wt. % or from 10 wt. % to 30 wt. % of mesoporous zeolite.

It should be understood that some embodiments of the presently-described methods and systems may utilize an HDA catalyst that includes a mesoporous zeolite (that is, having an average pore size of from 2 nm to 50 nm). However, in other embodiments, the average pore size of the zeolite may be less than 2 nm (that is, microporous).

According to one or more embodiments described, the volumetric ratio of HDM catalyst to HDS catalyst to HDA catalyst in the hydroprocessing unit 110 may be 5-20: 5-30: 5-30. The ratio of catalysts may depend at least partially on the metal content in the oil feedstock processed.

Figure 3:
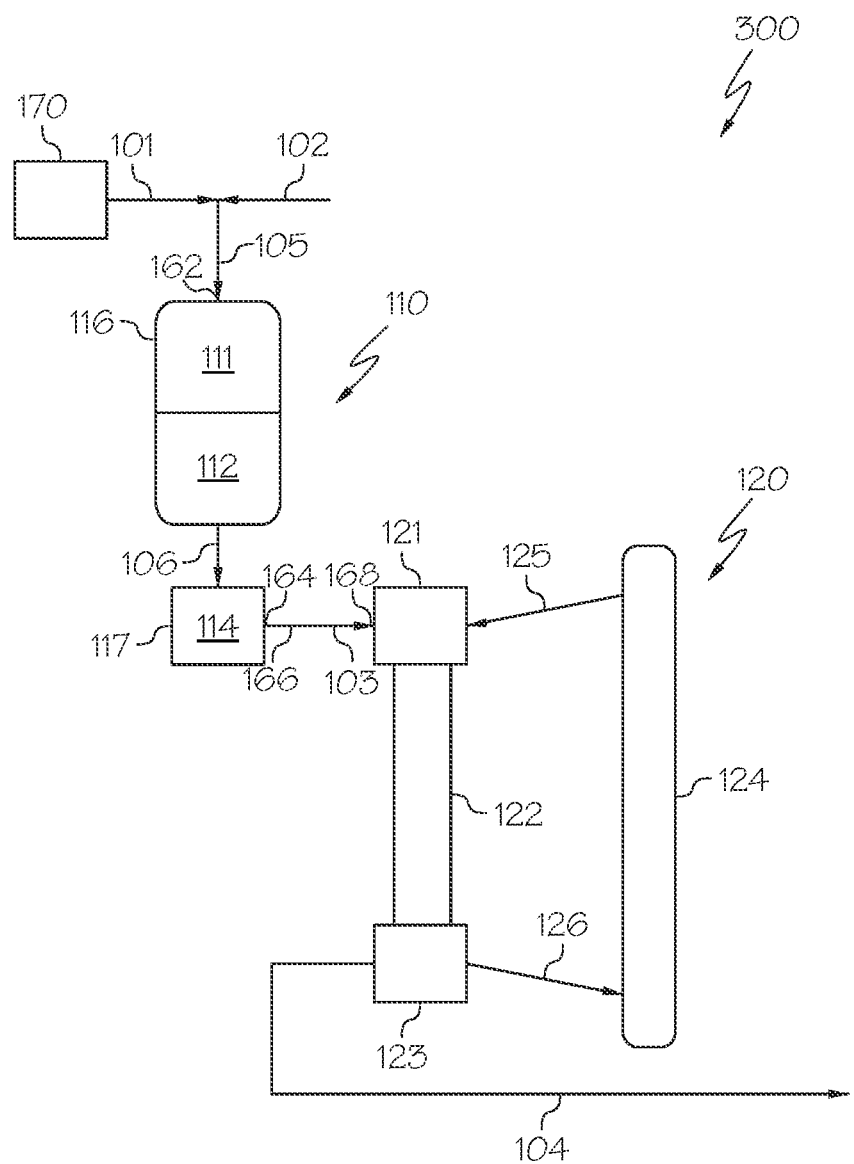
FIG. 3 depicts a generalized schematic diagram of another embodiment of a crude oil upgrading system in which a hydroprocessing unit includes an HDM catalyst and an HDS catalyst in a first reactor and an HDA catalyst in a second reactor downstream of the first reactor, according to one or more embodiments described in this disclosure.

Referring now to FIG. 3, a crude oil upgrading system 300 is depicted in which the hydroprocessing unit 110 may include or consist of multiple packed bed reaction zones arranged in series (for example, an HDM reaction zone 111 and an HDS reaction zone 112) and each of these reaction zones may comprise a catalyst bed. Each of these zones may be contained in a single reactor as a packed bed reactor with multiple beds in series, shown as an upstream packed bed hydroprocessing reactor 116 in FIG. 3, and a downstream packed bed hydrocracking reactor 117. The upstream packed bed hydroprocessing reactor 116 or plurality of upstream packed bed reactors may include the HDM reaction zone 111 and the HDS reaction zone 112. The downstream packed bed hydrocracking reactor 117 may include the HDA reaction zone 114. In such embodiments, the HDM reaction zone 111, the HDS reaction zone 112, and the HDA reaction zone 114 may utilize the respective catalysts and processing conditions disclosed with respect to the system of FIG. 2. The configuration of the upstream packed bed hydroprocessing reactor 116 or plurality of upstream packed bed reactors of FIG. 3 may enable the use of different reaction conditions such as, but not limited to, hydrogen content, temperature, or pressure are different for operation of the upstream packed bed hydroprocessing reactor 116 or plurality of upstream packed bed reactors and the downstream packed bed hydrocracking reactor 117. In such embodiments, the HDS reaction effluent 106 may be passed from the upstream packed bed hydroprocessing reactor 116 or plurality of upstream packed bed reactors to the downstream packed bed hydrocracking reactor 117.

Figure 4:
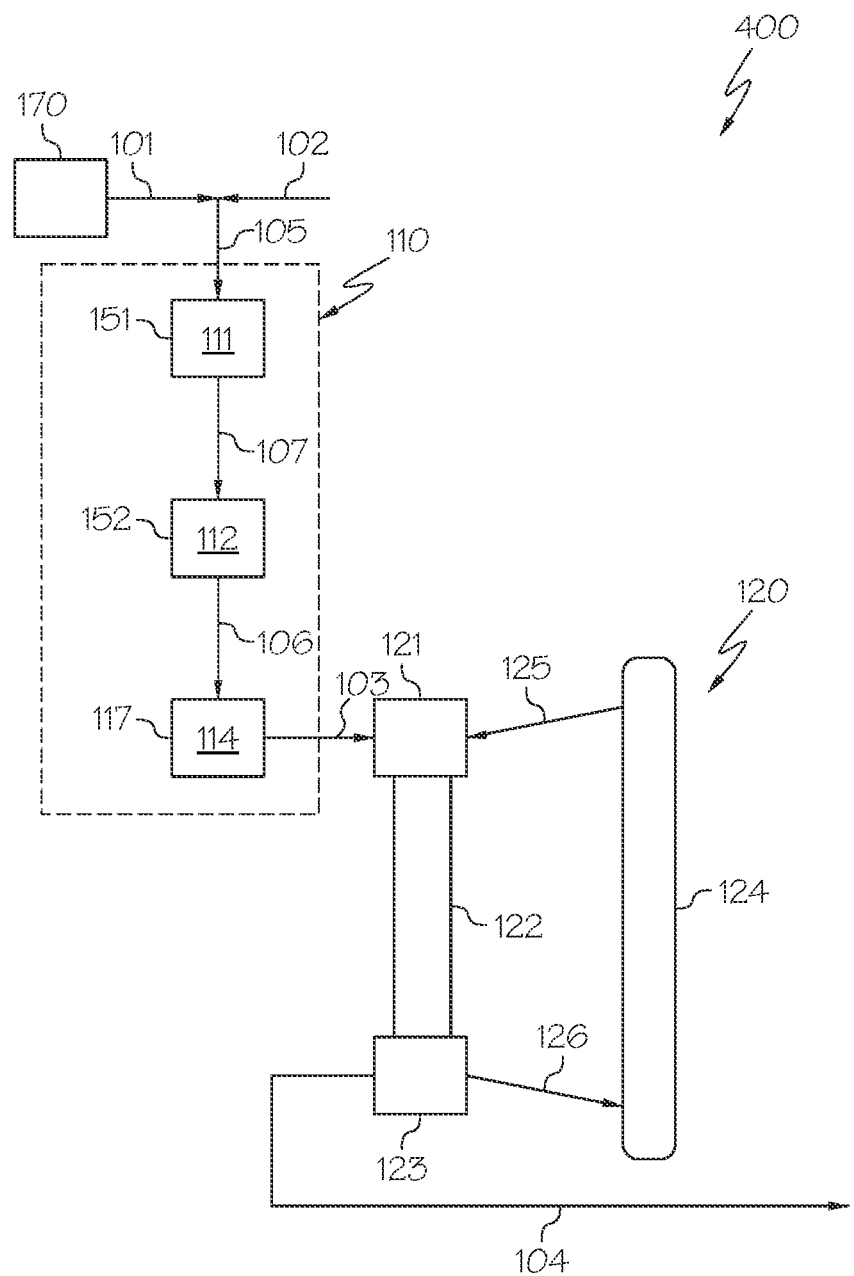
FIG. 4 depicts a generalized schematic diagram of another embodiment of a crude oil upgrading system in which a hydroprocessing unit includes an HDM catalyst, an HDS catalyst, and an HDA catalyst each in separate reactors arranged in series, according to one or more embodiments described in this disclosure.

Referring now to FIG. 4, a crude oil upgrading system 400 is depicted in which the hydroprocessing unit 110 may include or consist of multiple packed bed reaction zones contained in a plurality of reactors arranged in series with a downstream packed bed hydrocracking reactor 117. In some embodiments, the HDM reaction zone 111 may be contained in an HDM reactor 151, the HDS reaction zone 112 may be contained in an HDS reactor 152, and the HDA reaction zone 114 may be contained in the downstream packed bed hydrocracking reactor 117. The crude oil 101 is introduced to the HDM reaction zone 111 in the HDM reactor 151 and may be converted to an HDM reaction effluent 107. The HDM reaction effluent 107 may be passed to the HDS reaction zone 112 in the HDS reactor 152 and may be converted to an HDS reaction effluent 106. The HDS reaction effluent 106 may be passed to the HDA reaction zone 114 in the downstream packed bed hydrocracking reactor 117 and may be converted to hydroprocessed effluent 103. In such embodiments, the HDM reaction zone 111, the HDS reaction zone 112, and the HDA reaction zone 114 may utilize the respective catalysts and processing conditions previously discussed with respect to the system of FIG. 2.

Figure 5:
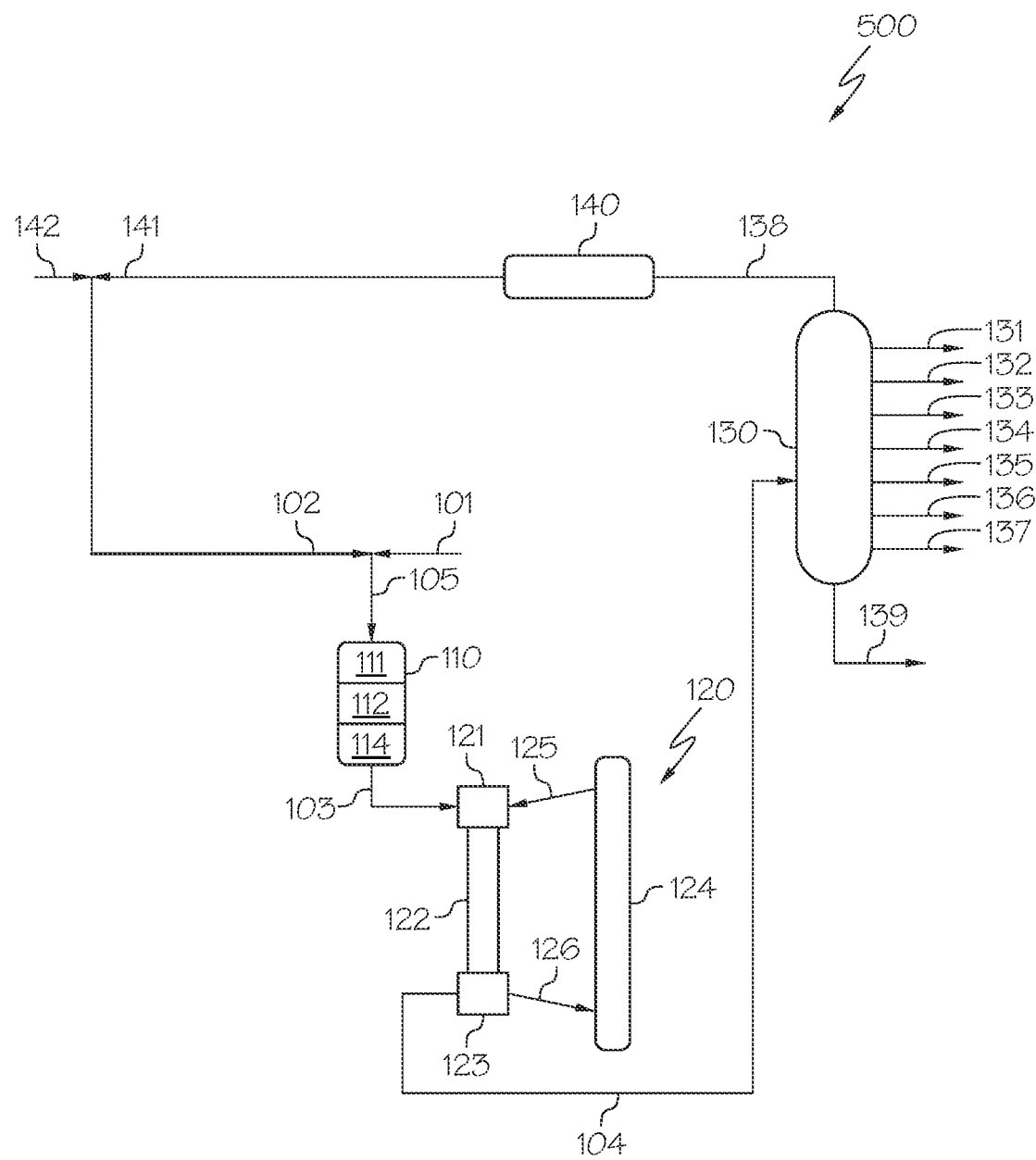
FIG. 5 depicts a generalized schematic diagram of the crude oil upgrading system of FIG. 2, which includes a separation unit disposed downstream of the HS-FCC unit, according to one or more embodiments described in this disclosure.

Now referring to FIG. 5, a crude oil upgrading system 500 is depicted that may include a separation unit 130 downstream of the HS-FCC unit 120. The cracked effluent 104 may be passed from the separation zone 123 of the HS-FCC unit 120 to the separation unit 130, which may be operable to separate the cracked effluent 104 into a plurality of streams, which may include at least one product stream and a bottoms stream 139. In some embodiments, the separation unit 130 may be a distillation or fractionation column operable to separate the contents of the cracked effluent 104 into one or more product streams, such as a hydrocarbon oil stream 131, a gasoline stream 132, a mixed butenes stream 133, a butadiene stream 134, a propene stream 135, an ethylene stream 136, a methane stream 137, a hydrogen stream 138, or combinations of these. As used in this disclosure, the product streams (such as the hydrocarbon oil stream 131, the gasoline stream 132, the mixed butenes stream 133, the butadiene stream 134, the propene stream 135, the ethylene stream 136, and the methane stream 137) may be referred to as petrochemical products, which may be used as intermediates in downstream chemical processing.

The hydrogen stream 138 may be processed by a hydrogen purification unit 140 and recycled back into the crude oil upgrading system 500 as a purified hydrogen stream 141. The purified hydrogen stream 141 may be supplemented with additional feed hydrogen from feed hydrogen stream 142. Alternatively, all or at least a portion of the hydrogen stream 138 or the purified hydrogen stream 141 may exit the system as system products or be burned for heat generation.

While the present description and examples are provided in the context of Arab Heavy crude oil as the material of the crude oil 101, it should be understood that the crude oil upgrading systems 100, 200, 300, 400, 500 described with respect to the embodiments of FIGS. 1-5, respectively, may be applicable for the conversion of a wide variety of heavy oils, (in crude oil 101), including, but not limited to, crude oil, vacuum residue, tar sands, bitumen, atmospheric residue, and vacuum gas oils.

EXAMPLES

The various aspects of the present disclosure will be further clarified by the following examples. The examples are illustrative in nature and should not be understood to limit the subject matter of the present disclosure.

Example 1: Hydroprocessing Crude Oil

In Example 1, crude oil was hydroprocessed in-house by feeding into a 3-layer hydroprocessing unit comprising an HDM catalyst (commercially available as KFR-22 from Albemarle), an HDS catalyst (commercially available as KFR-33 from Albemarle), and an HDA catalyst (commercially available as KFR-70 from Albemarle) to reduce the concentration of metals, sulfur, nitrogen, and aromatic compounds in the crude oil. The hydroprocessing unit consisted of a packed column with the HDM catalyst bed on the top, the HDS catalyst bed in the middle, and the HDA catalyst bed on the bottom. The HDM catalyst bed had a volume of 70 mL with a bulk density of 0.5 g/mL. The EDS catalyst bed had a volume of 70 mL with a bulk density of 0.6 g/mL. The HDA catalyst bed had a volume of 560 mL with a bulk density of 0.7 g/mL. For Example 1, the crude oil was Arab Medium crude oil, the properties of which are provided in Table 3 below. The hydroprocessing unit was operated at a temperature of 400° C., a pressure of 150 bar, and an LHSV of 0.3 h$^{-1}$. The hydroprocessed AM crude oil was analyzed according to the methods indicated in Table 3 and compared to its properties before hydroprocessing.

TABLE 3

| Properties | Method | Raw Arab Medium Crude | Hydroprocessed Arab Medium Crude |
| --- | --- | --- | --- |
| API (degrees) | ASTM-D287-12b | 31° | 36° |
| Density @ 15.6° C. (g/cm$^3$) | ASTM D4052 | 0.8748 | 0.84 |
| Nitrogen Content (ppmw) | ASTM D4629 | 1718 | 125 |
| Sulfur Content (wt. %) | ASTM D4294 | 2.44 | 0.05 |
| Fe (ppm) | ASTM D4294 | <1 | <1 |
| Na (ppm) | ASTM D3230 | 32 | <10 |
| Ni (ppm) | ASTM D4294 | <17 | <1 |
| V (ppm) | ASTM D4294 | 36 | <1 |

The boiling points at various compositions of the Arab Medium crude oil both before and after hydroprocessing were analyzed. These results are provided in Table 4 below.

TABLE 4

| Composition (wt. %) | Raw Arab Medium Crude Boiling Point | Hydroprocessed Arab Medium Crude Boiling Point |
| --- | --- | --- |
| 5.0 | 88° C. | 119.44° C. |
| 10.0 | 131° C. | 148.33° C. |
| 20.0 | 196° C. | 196.11° C. |
| 30.0 | 262° C. | 237.78° C. |
| 40.0 | 326° C. | 280.56° C. |
| 50.0 | 393° C. | 319.44° C. |
| 60.0 | 465° C. | 363.33° C. |
| 70.0 | 552° C. | 412.78° C. |
| 80.0 | 654° C. | 467.22° C. |
| 90.0 | 721° C. | 525° C. |
| 95.0 | >720° C. | 553.89° C. |
| Final Boiling Point (FBP) | >720° C. | 593.33° C. |

Example 2: Nano-ZSM-5 Zeolite Synthesis

A nano-ZSM-5 zeolite and an HS-FCC catalyst composition according to the present disclosure were prepared. The materials used in preparing the nano-ZSM-5 zeolite of Example 2 and the HS-FCC catalyst composition of Example 3 are provided below in Table 5.

TABLE 5

| Chemical | Supplier |
| --- | --- |
| LUDOX ® TM40 colloidal silica (SiO$_2$) | DuPont |
| Tetrapropylammounium hydroxide (TPAOH, C$_{12}$H$_{28}$NOH), 40% w/w | Alfa Aesar |
| Sodium hydroxide (NaOH) | Sigma Aldrich |
| Aluminum isopropoxide (Al(O—I—Pr)$_3$) | Sigma Aldrich |
| Y zeolite (CBV-780) | Zeolyst International |
| Formic acid | Sigma Aldrich |
| Clay | Petrobras |
| Alumina, PURAL ™ SB Grade | Petrobras |
| Diammonium hydrogen phosphate | Sigma Aldrich |
| Lanthanum nitrate (III) hydrate | Fluka |

To prepare the nano-ZSM-5 zeolites of Example 2, 40 gram (g) precursor solutions were prepared by mixing water, colloidal silica, sodium hydroxide, tetrapropylammounium hydroxide (TPAOH), and aluminum isopropoxide (Al(O—I—Pr)3), according to mole ratios (mole/mole) in Table 6 below. The precursor solutions were stirred for one day at room temperature, transferred into a Teflon lined stainless steel autoclave, heated to 140° C., and then held at 140° C. for 4 days to obtain the product solutions. The product solutions were centrifuged and the solid products were collected. The solid products were dispersed in deionized water and centrifuged to obtain washed products. The washed products were dried in an oven at 80° C. The washed products were calcined using the following program: heating at rate of 3° C./min, until reaching a temperature of 200° C., maintaining temperature for two hours, heating at rate of 3° C./min, until reaching a temperature of 550° C., and maintaining temperature for 8 hours to produce the nano-ZSM-5 zeolites of Example 2. The nano-ZSM-5 zeolites had an average particle diameter of 0.084 μm, as determined by electron microscopy. The nano-ZSM-5 zeolites had an average silica-to-alumina ratio of 33, an average surface area of 379 m$^2$/g, and an average total pore volume per unit weight of 0.254 cm$^3$/g.

TABLE 6

| Example | Precursor Solution (mole/mole) | | | | | Yield (%) | Product |
|---|---|---|---|---|---|---|---|
| | H2O | Colloidal Silica | NaOH | TPAOH | Al(O—I—Pr)3 | | |
| Ex. 1a | 20 | 1 | 0.1 | 0.250 | 0.030 | 2.14 | nano-ZSM-5 zeolite |
| Ex. 1b | | | | | | 4.44 | |
| Ex. 1c | | | | | | 4.61 | |
| Ex. 1d | | | | | | 4.61 | |

Example 3: Preparation of HS-FCC Catalyst Composition

To prepare the HS-FCC catalyst composition of Example 3, the nano-ZSM-5 zeolites were combined and impregnated with 7.5 wt. % phosphorous pentoxide, and the USY zeolite (commercially available as CBV-780 from Zeolyst International) was impregnated with 2.5 wt. % lanthanum oxide. The USY zeolite had an average total pore volume per unit weight of 0.486 cm$^3$/g. The nano-ZSM-5 zeolite impregnated with phosphorous pentoxide and the USY zeolite impregnated with lanthanum oxide were combined with water, the alumina binder, the colloidal silica, and the Kaolin clay to produce a mixture. The mixture was stirred for 1 hour and the resulting slurry was placed in a temperature-programmed oven for drying and calcination to produce HS-FCC catalyst composition particles. The HS-FCC catalyst composition particles were ground to a fine powder by means of a mortar and a pestle. Then, the ground HS-FCC catalyst composition microparticles were sieved for a fraction between 40-120 micrometers (μm) and used for characterization and evaluation. The composition of the HS-FCC catalyst composition microparticles of Example 3 is provided in Table 7 below.

TABLE 7

| Component | Weight % | Notes |
|---|---|---|
| Nano-ZSM-5 | 20 | Phosphorus impregnated at 7.5 wt % P2O5 on zeolite |
| USY | 21 | Lanthanum impregnated at 2.5 wt % La2O3 on zeolite |
| Alumina | 8 | Pural SB from Sasol |
| Clay | 49 | Kaolin |
| Silica | 2 | Added as colloidal silica Ludox ™-40 |

Example 4: Evaluation of HS-FCC Catalyst Composition of Example 3

In Example 4, the performance of the HS-FCC catalyst composition of Example 3 was evaluated for cracking hydroprocessed Arab Medium crude oil at a temperature of 650° C. and at a catalyst to oil weight ratio (CTO) of about 4.8. The catalytic cracking of hydroprocessed Arab Medium crude oil with the HS-FCC catalyst composition of Example 2 was carried out Sakuragi Rikagaku (Japan) Micro Activity Test (MAT) instrument using a quartz tubular reactor. The HS-FCC catalyst composition of Example 3 was evaluated for cracking hydroprocessed Arab Medium crude oil according to test method ASTM D-3907 method. Prior to evaluation, the HS-FCC catalyst composition was steamed at 810° C. for 6 hours prior to conducting the cracking reactions. The experiments were conducted in the MAT unit at 30 seconds time-on-stream (TOS).

After each reaction, the HS-FCC catalyst composition microparticles were stripped using Nitrogen ($N_2$) at a flow rate of 30 millimeters per minute (mL/min). The liquid product was collected in the liquid receiver and the gaseous products were collected in a gas burette by water displacement and sent to the gas chromatograph (GC) for analysis. The spent catalysts were used to measure the amount of generated coke from the reaction.

The MAT results from the cracking of hydroprocessed Arab Medium crude oil over the HS-FCC catalyst composition of Example 3 are shown in Table 8. As can be seen, a light olefin yield of 43.90 wt. % were obtained using the HS-FCC catalyst composition of Example 3 at reaction conditions of 650° C. and a catalyst to oil ratio of 4.82. Additionally, the propylene yield was 22.01 wt. % and the ethylene yield was 7.88 wt. %.

TABLE 8

| | Example 4 |
|---|---|
| Temp. (° C.) | 650 |
| Injection Time (s) | 30 |
| Catalyst code | MAH-12 |
| Steaming conditions | 810° C., 6 h |
| Feed code | HT AM crude |
| Mass Balance (%) | 100.16 |
| CTO Ratio | 4.82 |
| Conversion (%) (total gas + coke) | 56.86 |
| Conversion (%) (100 − LCO) | 91.89 |
| Yields (mass %) | |
| H2 | 0.446 |
| C1 | 2.96 |
| C2 | 2.35 |
| C2= | 7.88 |
| C3 | 2.11 |
| C3= | 22.01 |
| iC4 | 2.33 |
| nC4 | 0.87 |
| t2C4= | 3.21 |
| 1C4= | 2.81 |
| iC4= | 5.04 |
| c2C4= | 2.70 |
| 1,3-BD | 0.140 |
| C4= (Liq.) | 0.110 |
| Total Gas | 54.96 |
| Gasoline | 35.03 |
| Light Cycle Oil (LCO) | 7.19 |
| Heavy Cycle Oil (HCO) | 0.92 |
| Coke | 1.90 |
| Groups (mass %) | |
| H2—C2 (dry gas) | 13.63 |
| C3—C4 (LPG) | 41.33 |
| C2= − C4= (Light olefins) | 43.90 |
| C3= + C4= | 36.02 |
| C4= (Butenes) | 14.01 |
| Molar ratio (mol/mol) | |
| C2=/C2 | 3.59 |
| C3=/C3 | 10.95 |
| C4=/C4 | 4.54 |
| iC4=/C4= | 0.360 |
| iC4=/iC4 | 2.24 |

Comparative Example 5: Evaluation of Hydroprocessing Crude Oil of Example 1

In Comparative Example 5, the performance of the hydroprocessing step was evaluated for cracking Arab Medium crude oil at a reaction temperature of 650° C. and a catalyst-to-oil ratio of 5. The catalytic cracking of Arab Medium crude oil with the commercial HS-FCC catalyst compositions of Comparative Example 5 were carried out as described in Example 4. The MAT results from the cracking of Arab Medium crude oil over the commercial HS-FCC catalyst compositions of Comparative Example 5 are shown in Table 9.

TABLE 9

|  | Comparative Example 5 | Example 4 |
|---|---|---|
| Temp. (° C.) | 650 | 650 |
| Injection Time (s) | 30 | 30 |
| Catalyst code | MAH12 | MAH-12 |
| Steaming conditions | 810° C., 6 h | 810° C., 6 h |
| Feed code | AM crude | HT AM crude |
| CAT/OIL | 5.00 | 4.82 |
| Conversion (%) | 85.46 | 91.89 |
| Yields (mass %) | | |
| H2 | 0.31 | 0.446 |
| C1 | 4.07 | 2.96 |
| C2 | 2.87 | 2.35 |
| C2= | 8.08 | 7.88 |
| C3 | 2.41 | 2.11 |
| C3= | 17.71 | 22.01 |
| iC4 | 1.37 | 2.33 |
| nC4 | 1.55 | 0.87 |
| t2C4= | 2.23 | 3.21 |
| 1C4= | 2.06 | 2.81 |
| iC4= | 3.50 | 5.04 |
| c2C4= | 1.88 | 2.70 |
| 1,3-BD | 0.12 | 0.140 |
| C4= (Liq.) | 0.04 | 0.110 |
| Total Gas | 48.20 | 54.96 |
| Gasoline | 29.02 | 35.03 |
| LCO | 11.11 | 7.19 |
| HCO | 3.43 | 0.92 |
| Coke | 8.24 | 1.90 |
| Groups (mass %) | | |
| H2—C2 (dry gas) | 15.33 | 13.63 |
| C3—C4 (LPG) | 32.87 | 41.33 |
| C2= - C4= (Light olefins) | 35.61 | 43.90 |
| C3= + C4= | 27.53 | 36.02 |
| C4= (Butenes) | 9.82 | 14.01 |
| Molar ratio (mol/mol) | | |
| C2=/C2 | 3.02 | 3.59 |
| C3=/C3 | 7.69 | 10.95 |
| C4=/C4 | 3.49 | 4.54 |
| iC4=/C4= | 0.36 | 0.360 |
| iC4=/iC4 | 2.65 | 2.24 |

As can be seen in Table 9, the light olefin yield using the non-hydroprocessed Arab Medium crude oil of Comparative Example 5 was 35.61 wt. %. Additionally, the propylene yield was 17.71 wt. % and the ethylene yield was 8.08 wt. %. Comparatively, the hydroprocessed Arab Medium crude oil of Example 4 produced a light olefin yield of 43.90 wt. % and a propylene yield of 22.01 wt. % and the ethylene yield was 7.88 wt. % under similar conditions.

Comparative Examples 6 and 7: Evaluation of HS-FCC catalyst Composition of Example 3

In Comparative Examples 6 and 7, the performance of the HS-FCC catalyst of Example 3 was evaluated for cracking hydroprocessed Arab Medium crude oil at a reaction temperature of 650° C. and a catalyst-to-oil ratio of about 5. The catalytic cracking of hydroprocessed Arab Medium crude oil with the commercial HS-FCC catalyst compositions of Comparative Examples 6 and 7 were carried out as described in Example 4. Olefins Ultra is a commercial catalyst based on ZSM-5 zeolite while HSFCC 5A is a commercial catalyst based on Y-zeolite. The MAT results from the cracking of Arab Medium crude oil over the commercial HS-FCC catalyst compositions of Comparative Example 5 are shown in Table 10.

TABLE 10

|  | Comparative Example 6 | Comparative Example 7 | Example 4 |
|---|---|---|---|
| Temp. (° C.) | 650 | 650 | 650 |
| Injection Time (s) | 30.00 | 30.00 | 30 |
| Catalyst code | Olefins Ultra | HSFCC 5A | MAH-12 |
| Steaming conditions | 810° C., 6 h | 810° C., 6 h | 810° C., 6 h |
| Feed code | HT AM crude | HT AM crude | HT AM crude |
| CAT/OIL | 5.03 | 4.87 | 4.82 |
| Conversion (%) | 67.55 | 89.22 | 91.89 |
| H2 | 0.28 | 0.23 | 0.446 |
| C1 | 3.03 | 3.30 | 2.96 |
| C2 | 3.08 | 2.53 | 2.35 |
| C2= | 10.57 | 5.04 | 7.88 |
| C3 | 5.44 | 1.49 | 2.11 |
| C3= | 11.42 | 12.87 | 22.01 |
| iC4 | 0.95 | 2.40 | 2.33 |
| nC4 | 1.16 | 0.72 | 0.87 |
| t2C4= | 1.02 | 2.85 | 3.21 |
| 1C4= | 0.96 | 2.63 | 2.81 |
| iC4= | 1.63 | 4.10 | 5.04 |
| c2C4= | 0.86 | 2.40 | 2.70 |
| 1,3-BD | 0.11 | 0.15 | 0.140 |
| C4= (Liq.) | 0.05 | 0.33 | 0.110 |
| Total Gas | 40.57 | 41.03 | 54.96 |
| Gasoline | 24.77 | 45.68 | 35.03 |
| LCO | 18.59 | 8.92 | 7.19 |
| HCO | 13.86 | 1.85 | 0.92 |
| Coke | 2.22 | 2.52 | 1.90 |
| Groups (mass %) | | | |
| H2—C2 (dry gas) | 16.96 | 11.09 | 13.63 |
| C3—C4 (LPG) | 23.61 | 29.94 | 41.33 |
| C2= - C4= (Light olefins) | 26.62 | 30.36 | 43.90 |
| C3= + C4= | 16.06 | 25.33 | 36.02 |
| C4= (Butenes) | 4.63 | 12.46 | 14.01 |
| Molar ratio (mol/mol) | | | |
| C2=/C2 | 3.68 | 2.14 | 3.59 |
| C3=/C3 | 2.20 | 9.02 | 10.95 |
| C4=/C4 | 2.28 | 4.15 | 4.54 |
| iC4=/C4= | 0.35 | 0.33 | 0.360 |
| iC4=/iC4 | 1.77 | 1.77 | 2.24 |

As can be seen in Table 10, the light olefin yields using other commercially available catalysts when cracking hydroprocessed Arab Medium crude oil of Comparative Examples 6 and 7 were 26.62 wt. % and 30.36 wt. %, respectively. Additionally, the propylene yields of Comparative Examples 6 and 7 were 11.42 wt. % and 12.87 wt. %, and the ethylene yields were 10.57 wt. % and 5.04 wt. %. Comparatively, the hydroprocessed Arab Medium crude oil of Example 4 using the HS-FCC catalyst Composition of Example 3 produced a light olefin yield of 43.90 wt. % and a propylene yield of 22.01 wt. % and the ethylene yield was 7.88 wt. % under similar conditions.

Aspects

A first aspect of the present disclosure is directed to a process for upgrading a crude oil comprising: contacting the crude oil with one or more hydroprocessing catalysts to produce a hydroprocessed effluent wherein the crude oil has an API gravity from 30 to 35; and contacting the hydroprocessed effluent with a high-severity fluidized catalytic cracking (HS-FCC) catalyst composition in a high-severity FCC (HS-FCC) unit to produce cracked effluent comprising olefins, aromatic compounds, or both, wherein the HS-FCC unit operates at a temperature of greater than or equal to 580° C., a weight ratio of the HS-FCC catalyst composition to the crude oil of from 2:1 to 10:1, and a residence time of from 0.1 seconds to 60 seconds, wherein: the HS-FCC catalyst composition comprises: ultrastable Y-type zeolite (USY zeolite) impregnated with lanthanum; nano-ZSM-5 zeolite impregnated with phosphorous, where the nano-ZSM-5 zeolite has an average particle size of from 0.01 μm to 0.2 μm; an alumina binder; colloidal silica; and a matrix material comprising Kaolin clay.

In a second aspect of the present disclosure, in combination with the first aspect, wherein the crude oil is an Arab Medium crude oil.

In a third aspect of the present disclosure, in combination with any of the first or second aspects, wherein the hydroprocessing catalysts comprise at least one hydrodemetalization (HDM) catalyst, at least one hydrodesulfurization (HDS) catalyst, and at least one hydrodearomatization (HDA) catalyst.

In a fourth aspect of the present disclosure, in combination with any of the first through third aspects, in which: the HDM catalyst and the HDS catalyst are positioned in series in a plurality of reactors with the HDA catalyst positioned in a reactor downstream of the plurality of reactors; or each of a plurality of packed bed reaction zones are contained in a single reactor comprising the plurality of packed bed reaction zones.

In a fifth aspect of the present disclosure, in combination with any of the first through fourth aspects, in which the HDM catalyst, the HDS catalyst, and the HDA catalyst are positioned in series in a plurality of packed bed reaction zones.

In a sixth aspect of the present disclosure, in combination with any of the first through fifth aspects, wherein the crude oil has a density of greater than 0.8 grams per milliliter at 15 degrees Celsius.

In a seventh aspect of the present disclosure, in combination with any of the first through sixth aspects, wherein the crude oil has an initial boiling point from 75 degrees Celsius to 125 degrees Celsius and a final boiling point greater than 720 degrees Celsius.

In an eighth aspect of the present disclosure, in combination with any of the first through seventh aspects, wherein at least 50 weight percent of the crude oil has a boiling point temperature greater than or equal to 400 degrees Celsius.

In a ninth aspect of the present disclosure, in combination with any of the first through eighth aspects, wherein the crude oil is contacted with the one or more hydroprocessing catalysts at a temperature from 375 degrees Celsius to 425 degrees Celsius.

In a tenth aspect of the present disclosure, in combination with any of the first through ninth aspects, wherein the crude oil is contacted with the one or more hydroprocessing catalysts at a pressure of from 140 bar to 160 bar.

In an eleventh aspect of the present disclosure, in combination with any of the first through tenth aspects, in which the hydroprocessed effluent has a sulfur content of less than 0.1 wt. % and a nitrogen content of less than 175 parts per million by weight (ppmw).

In a twelfth aspect of the present disclosure, in combination with any of the first through eleventh aspects, in which the hydroprocessed effluent has a density of from 0.75 grams per cubic centimeter at 15 degrees Celsius to 0.90 grams per cubic centimeter at 15 degrees Celsius.

In a thirteenth aspect of the present disclosure, in combination with any of the first through twelfth aspects, wherein the HS-FCC catalyst composition comprises from 10 wt. % to 30 wt. % USY zeolite impregnated with lanthanum.

In a fourteenth aspect of the present disclosure, in combination with any of the first through thirteenth aspects, wherein the HS-FCC catalyst composition comprises from 10 wt. % to 30 wt. % nano-ZSM-5 zeolite impregnated with phosphorous.

In a fifteenth aspect of the present disclosure, in combination with any of the first through fourteenth aspects, wherein the USY zeolite is impregnated with from 1 wt. % to 5 wt. % lanthanum oxide based on a total weight of the USY zeolite.

In a sixteenth aspect of the present disclosure, in combination with any of the first through fifteenth aspects, wherein the nano-ZSM-5 zeolite is impregnated with from 1 wt. % to 15 wt. % phosphorous pentoxide based on a total weight of the nano-ZSM-5 zeolite.

In a seventeenth aspect of the present disclosure, in combination with any of the first through sixteenth aspects, wherein the HS-FCC catalyst composition comprises 20-22 wt. % USY zeolite impregnated with lanthanum, 19-21 wt. % nano-ZSM-5 zeolite impregnated with phosphorous, 7-9 wt. % alumina binder, 48-50 wt. % Kaolin clay, and 1-3 wt. % colloidal silica, where the weight percentages are based on a total weight of the HS-FCC catalyst composition.

In an eighteenth aspect of the present disclosure, in combination with any of the first through seventeenth aspects, in which the cracking of the hydroprocessed effluent comprises contacting the hydroprocessed effluent with a HS-FCC catalyst in the HS-FCC unit at a weight ratio of the HS-FCC catalyst to the hydroprocessed effluent of from 2:1 to 10:1.

In a nineteenth aspect of the present disclosure, in combination with any of the first through eighteenth aspects, where the HS-FCC unit is a downflow HS-FCC unit.

In a twentieth aspect of the present disclosure, in combination with any of the first through nineteenth aspects, in which the cracked effluent exiting from the HS-FCC has a light olefin content of at least 40% by mass, an ethylene content of at least 5% by mass, a propylene content of at least 20% by mass, or combinations thereof.

It is noted that any two quantitative values assigned to a property may constitute a range of that property, and all combinations of ranges formed from all stated quantitative values of a given property are contemplated in this disclosure.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific aspects, it is noted that the various details of such aspects should not be taken to imply that these details are essential components of the aspects. Rather, the claims appended hereto should be taken as the sole representation of the breadth of the present disclosure and the corresponding scope of the various aspects described in this disclosure. Further, it will be apparent that modifications and variations are possible without departing from the scope of the appended claims.

What is claimed is:

1. A process for upgrading a crude oil comprising:
   contacting the crude oil with one or more hydroprocessing catalysts to produce a hydroprocessed effluent wherein the crude oil has an API gravity from 30 to 35; and
   contacting the hydroprocessed effluent with a high-severity fluidized catalytic cracking (HS-FCC) catalyst composition in a high-severity FCC (HS-FCC) unit to produce cracked effluent comprising olefins, aromatic compounds, or both, wherein the HS-FCC unit operates at a temperature of greater than or equal to 580° C., a weight ratio of the HS-FCC catalyst composition to the crude oil of from 2:1 to 6:1, and a residence time of from 0.1 seconds to 60 seconds, wherein:
   the HS-FCC catalyst composition comprises:
      ultrastable Y-type zeolite (USY zeolite) impregnated with lanthanum;
      nano-ZSM-5 zeolite impregnated with phosphorous, where the nano-ZSM-5 zeolite has an average particle size of from 0.01 µm to 0.2 µm;
      an alumina binder;
      colloidal silica; and
      a matrix material comprising Kaolin clay.

2. The process of claim 1, wherein the crude oil is an Arab Medium crude oil.

3. The process of claim 1, wherein the hydroprocessing catalysts comprise at least one hydrodemetalization (HDM) catalyst, at least one hydrodesulfurization (HDS) catalyst, and at least one hydrodearomatization (HDA) catalyst.

4. The process of claim 3, in which:
   the HDM catalyst and the HDS catalyst are positioned in series in a plurality of reactors with the HDA catalyst positioned in a reactor downstream of the plurality of reactors; or
   each of a plurality of packed bed reaction zones are contained in a single reactor comprising the plurality of packed bed reaction zones.

5. The process of claim 3, in which the HDM catalyst, the HDS catalyst, and the HDA catalyst are positioned in series in a plurality of packed bed reaction zones.

6. The process of claim 1, wherein the crude oil has a density of greater than 0.8 grams per milliliter at 15 degrees Celsius.

7. The process of claim 1, wherein the crude oil has an initial boiling point from 75 degrees Celsius to 125 degrees Celsius and a final boiling point greater than 720 degrees Celsius.

8. The process of claim 1, wherein at least 50 weight percent of the crude oil has a boiling point temperature greater than or equal to 400 degrees Celsius.

9. The process of claim 1, wherein the crude oil is contacted with the one or more hydroprocessing catalysts at a temperature from 375 degrees Celsius to 425 degrees Celsius.

10. The process of claim 1, wherein the crude oil is contacted with the one or more hydroprocessing catalysts at a pressure of from 140 bar to 160 bar.

11. The process of claim 1, in which the hydroprocessed effluent has a sulfur content of less than 0.1 wt. % and a nitrogen content of less than 175 parts per million by weight (ppmw).

12. The process of claim 1, in which the hydroprocessed effluent has a density of from 0.75 grams per cubic centimeter at 15 degrees Celsius to 0.90 grams per cubic centimeter at 15 degrees Celsius.

13. The process of claim 1, wherein the HS-FCC catalyst composition comprises from 10 wt. % to 30 wt. % USY zeolite impregnated with lanthanum.

14. The process of claim 1, wherein the HS-FCC catalyst composition comprises from 10 wt. % to 30 wt. % nano-ZSM-5 zeolite impregnated with phosphorous.

15. The process of claim 1, wherein the USY zeolite is impregnated with from 1 wt. % to 5 wt. % lanthanum oxide based on a total weight of the USY zeolite.

16. The process of claim 1, wherein the nano-ZSM-5 zeolite is impregnated with from 1 wt. % to 15 wt. % phosphorous pentoxide based on a total weight of the nano-ZSM-5 zeolite.

17. The process of claim 1, wherein the HS-FCC catalyst composition comprises 20-22 wt. % USY zeolite impregnated with lanthanum, 19-21 wt. % nano-ZSM-5 zeolite impregnated with phosphorous, 7-9 wt. % alumina binder, 48-50 wt. % Kaolin clay, and 1-3 wt. % colloidal silica, where the weight percentages are based on a total weight of the HS-FCC catalyst composition.

18. The process of claim 1, where the HS-FCC unit is a downflow HS-FCC unit.

19. The process of claim 1, in which the cracked effluent exiting from the HS-FCC has a light olefin content of at least 40% by mass, an ethylene content of at least 5% by mass, a propylene content of at least 20% by mass, or combinations thereof.

* * * * *